United States Patent
Takata

(10) Patent No.: US 12,036,820 B2
(45) Date of Patent: Jul. 16, 2024

(54) PNEUMATIC TIRE

(71) Applicant: The Yokohama Rubber Co., LTD., Tokyo (JP)

(72) Inventor: Mina Takata, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 122 days.

(21) Appl. No.: 17/577,323

(22) Filed: Jan. 17, 2022

(65) Prior Publication Data

US 2022/0134807 A1 May 5, 2022

Related U.S. Application Data

(62) Division of application No. 16/087,611, filed as application No. PCT/JP2017/004694 on Feb. 9, 2017, now Pat. No. 11,235,623.

(30) Foreign Application Priority Data

Mar. 31, 2016 (JP) .................. 2016-071205
Jul. 29, 2016 (JP) .................. 2016-150190

(51) Int. Cl.
| | |
|---|---|
| *B60C 11/11* | (2006.01) |
| *B60C 9/18* | (2006.01) |
| *B60C 11/03* | (2006.01) |
| *B60C 11/12* | (2006.01) |
| *B60C 11/13* | (2006.01) |

(52) U.S. Cl.
CPC .......... *B60C 11/1236* (2013.01); *B60C 9/18* (2013.01); *B60C 11/03* (2013.01);
(Continued)

(58) Field of Classification Search
CPC ............ B60C 11/0306; B60C 11/0083; B60C 2011/0348
See application file for complete search history.

(56) References Cited

U.S. PATENT DOCUMENTS 4,649,975 A    3/1987  Kogure et al.
4,884,607 A *  12/1989 Mori ................ B60C 11/13
                                               152/209.28
(Continued)

FOREIGN PATENT DOCUMENTS

DE        696 04 427      5/2000
DE     11 2008 001 558    7/2014
(Continued)

OTHER PUBLICATIONS

English machine translation of JP-2010105561-A (Year: 2010).*
(Continued)

*Primary Examiner* — Robert C Dye
(74) *Attorney, Agent, or Firm* — Thorpe North & Western

(57) ABSTRACT

A pneumatic tire includes circumferential grooves aligned in a lateral direction and extending in a circumferential direction, lateral grooves aligned in the circumferential direction and extending to cross the circumferential direction, communicating at ends with the circumferential grooves and defining a block-shaped land portion between the circumferential grooves, two narrow grooves aligned in the lateral direction and extending in the circumferential direction, communicating at ends with a lateral groove and dividing the land portion defined by each of the circumferential grooves and each of the lateral grooves into small land portions, the narrow grooves having a smaller groove width than the circumferential grooves and being formed with a bent portion in an intermediate portion, the bent portion being disposed inward in the lateral direction, and bend points of the bent portions being disposed at positions offset from one another in the circumferential direction.

8 Claims, 20 Drawing Sheets

(52) U.S. Cl.
CPC .......... *B60C 11/0306* (2013.01); *B60C 11/12* (2013.01); *B60C 11/1204* (2013.01); *B60C 11/1259* (2013.01); *B60C 11/1272* (2013.01); *B60C 11/1384* (2013.01); *B60C 2011/0348* (2013.01); *B60C 2011/036* (2013.01); *B60C 2011/1245* (2013.01); *B60C 2200/06* (2013.01)

(56) References Cited

U.S. PATENT DOCUMENTS

| | | | |
|---|---|---|---|
| 5,109,903 | A | 5/1992 | Watanabe et al. |
| 5,824,169 | A | 10/1998 | Landers et al. |
| 6,073,668 | A * | 6/2000 | Iwasaki .................. B60C 11/01 152/454 |
| 6,607,018 | B1 | 8/2003 | Fukunaga et al. |
| 2004/0112494 | A1 | 6/2004 | Colombo et al. |
| 2004/0221936 | A1 | 11/2004 | Kaiser et al. |
| 2009/0229721 | A1 * | 9/2009 | Ikeda .................. B60C 11/033 152/209.18 |
| 2011/0209806 | A1 | 9/2011 | Kishida et al. |
| 2012/0305155 | A1 * | 12/2012 | Hamanaka .............. B60C 11/11 152/209.18 |
| 2015/0298506 | A1 | 10/2015 | Katayama et al. |

FOREIGN PATENT DOCUMENTS

| | | |
|---|---|---|
| EP | 0 296 605 | 12/1988 |
| EP | 1 459 908 | 9/2004 |
| JP | H02-099410 | 4/1990 |
| JP | H03-143708 | 6/1991 |
| JP | H06-270612 | 9/1994 |
| JP | H08-091023 | 4/1996 |
| JP | H09-142109 | 6/1997 |
| JP | 2000-142034 | 5/2000 |
| JP | 2003-182315 | 7/2003 |
| JP | 2005153812 A * | 6/2005 |
| JP | 2007-153104 | 6/2007 |
| JP | 2008-260343 | 10/2008 |
| JP | 2010-105561 | 5/2010 |
| JP | 2010105561 A * | 5/2010 |
| JP | 2011-105100 | 6/2011 |
| JP | 2011105100 A * | 6/2011 |
| JP | 2015-174469 | 10/2015 |
| KR | 10-2003-0059600 | 7/2003 |
| KR | 10-2007-0045617 | 5/2007 |
| WO | WO 2008/152914 | 12/2008 |
| WO | WO 2012/043036 | 4/2012 |
| WO | WO 2014/084325 | 6/2014 |

OTHER PUBLICATIONS

English machine translation of JP-2011105100-A (Year: 2011).*
English machine translation of JP2005153812A. (Year: 2005).*
International Search Report for International Application No. PCT/JP2017/004694 dated May 9, 2017, 4 pages, Japan.
Chinese Office Action for Chinese Application No. 201780018274.5 dated Nov. 28, 2019, 17 pages, Chin.

* cited by examiner

| | SPECIFIED RANGE | CONVENTIONAL EXAMPLE | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | EXAMPLE 1 | EXAMPLE 2 | EXAMPLE 3 |
|---|---|---|---|---|---|---|---|---|---|---|
| NUMBER OF NARROW GROOVES IN LAND PORTION | 2 | 0 | 1 | 2 | 2 | 2 | 2 | 2 | 2 | 2 |
| NARROW GROOVE SHAPE | BENT | - | STRAIGHT | STRAIGHT | BENT | BENT | BENT | BENT | BENT | BENT |
| POSITION OF BENT PORTION | INWARD | - | - | - | OUTWARD | OUTWARD | INWARD | INWARD | INWARD | INWARD |
| BENT PORTION OFFSET | YES | - | - | - | NO | YES | NO | YES | YES | YES |
| GROOVE WIDTH WA OF CIRCUMFERENTIAL GROOVES (mm) | - | 10 | 10 | 10 | 10 | 10 | 10 | 10 | 10 | 10 |
| GROOVE WIDTH WC OF NARROW GROOVES (mm) | - | - | - | 2 | 2 | 2 | 2 | 2 | 2 | 2 |
| BEND ANGLE (°) | FROM 90 TO 160 | - | - | - | 60 | 60 | 60 | 60 | 170 | 120 |
| RELATION (Lc/L) BETWEEN SHIFT WIDTH LC OF BENT PORTION AND TIRE CIRCUMFERENTIAL DIRECTION DIMENSION L OF LAND PORTION | 0.1 ≤ | - | - | - | - | 0.05 | - | 0.05 | 0.05 | 0.05 |
| ANGLE OF LATERAL GROOVE WITH RESPECT TO TIRE LATERAL DIRECTION (°) | FROM 5 TO 50 | 0 | 0 | 0 | 0 | 0 | 0 | 0 | 0 | 0 |
| GROOVE DEPTH HA OF CIRCUMFERENTIAL GROOVES (mm) | - | 15 | 15 | 15 | 15 | 15 | 15 | 15 | 15 | 15 |
| GROOVE DEPTH HB OF LATERAL GROOVES (mm) | FROM 1 TO 5 | 7 | 7 | 7 | 7 | 7 | 7 | 7 | 7 | 7 |
| GROOVE DEPTH HC OF NARROW GROOVES (mm) | FROM 1 TO 5 | - | 7 | 7 | 7 | 7 | 7 | 7 | 7 | 7 |
| CHAMFER AT CIRCUMFERENTIAL GROOVE END | YES | NO | NO | NO | NO | NO | NO | NO | NO | NO |
| SIPE | YES | NO | NO | NO | NO | NO | NO | NO | NO | NO |
| UNEVEN WEAR RESISTANCE PERFORMANCE | - | 100 | 102 | 104 | 106 | 106 | 106 | 106 | 102 | 105 |
| DURABILITY PERFORMANCE | - | 100 | 99 | 98 | 97 | 100 | 97 | 101 | 107 | 109 |

FIG. 7

| | SPECIFIED RANGE | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|---|---|---|
| NUMBER OF NARROW GROOVES IN LAND PORTION | 2 | 2 | 2 | 2 | 2 | 2 | 2 | 2 | 2 | 2 |
| NARROW GROOVE SHAPE | BENT | BENT | BENT | BENT | BENT | BENT | BENT | BENT | BENT | BENT |
| POSITION OF BENT PORTION | INWARD | INWARD | INWARD | INWARD | INWARD | INWARD | INWARD | INWARD | INWARD | INWARD |
| BENT PORTION OFFSET | YES | YES | YES | YES | YES | YES | YES | YES | YES | YES |
| GROOVE WIDTH WA OF CIRCUMFERENTIAL GROOVES (mm) | - | 10 | 10 | 10 | 10 | 10 | 10 | 10 | 10 | 10 |
| GROOVE WIDTH WC OF NARROW GROOVES (mm) | - | 2 | 2 | 2 | 2 | 2 | 2 | 2 | 2 | 2 |
| BEND ANGLE (°) | FROM 90 TO 160 | 120 | 120 | 120 | 120 | 120 | 120 | 120 | 120 | 120 |
| RELATION (Lc/L) BETWEEN SHIFT WIDTH LC OF BENT PORTION AND TIRE CIRCUMFERENTIAL DIRECTION DIMENSION L OF LAND PORTION | 0.1 ≤ | 0.2 | 0.2 | 0.2 | 0.2 | 0.2 | 0.2 | 0.2 | 0.2 | 0.2 |
| ANGLE OF LATERAL GROOVE WITH RESPECT TO TIRE LATERAL DIRECTION (°) | FROM 5 TO 50 | 0 | 25 | 60 | 25 | 25 | 25 | 25 | 25 | 25 |
| GROOVE DEPTH HA OF CIRCUMFERENTIAL GROOVES (mm) | - | 15 | 15 | 15 | 15 | 15 | 15 | 15 | 15 | 15 |
| GROOVE DEPTH HB OF LATERAL GROOVES (mm) | FROM 1 TO 5 | 7 | 7 | 7 | 2 | 0.5 | 2 | 2 | 2 | 2 |
| GROOVE DEPTH HC OF NARROW GROOVES (mm) | FROM 1 TO 5 | 7 | 7 | 7 | 7 | 7 | 2 | 0.5 | 2 | 2 |
| CHAMFER AT CIRCUMFERENTIAL GROOVE END | YES | NO | NO | NO | NO | NO | NO | NO | YES | YES |
| SIPE | YES | NO | NO | NO | NO | NO | NO | NO | NO | YES |
| UNEVEN WEAR RESISTANCE PERFORMANCE | - | 106 | 108 | 108 | 108 | 106 | 108 | 104 | 110 | 113 |
| DURABILITY PERFORMANCE | - | 112 | 112 | 108 | 114 | 116 | 119 | 121 | 119 | 120 |

FIG. 8

| CIRCUMFERENTIAL BELT | SPECIFIED RANGE | CONVENTIONAL EXAMPLE | EXAMPLE 101 | EXAMPLE 102 | EXAMPLE 103 | EXAMPLE 104 | EXAMPLE 105 | EXAMPLE 106 | EXAMPLE 107 | EXAMPLE 108 | EXAMPLE 109 |
|---|---|---|---|---|---|---|---|---|---|---|---|
|  | YES | YES | YES | YES | YES | YES | YES | YES | YES | YES | YES |
| θ1 (°) |  | 60 | 60 | 60 | 60 | 60 | 60 | 60 | 60 | 60 | 60 |
| θ2 (°) | θ1 < θ2 < θ3 | 60 | 66 | 66 | 66 | 66 | 66 | 66 | 66 | 66 | 66 |
| θ3 (°) |  | 60 | 72 | 71 | 69 | 67 | 69 | 69 | 69 | 69 | 69 |
| θ2 − θ1 (°) | θ2 − θ1 > θ3 − θ2 | 0 | 6 | 6 | 6 | 6 | 6 | 6 | 6 | 6 | 6 |
| θ3 − θ2 (°) |  | 0 | 6 | 5 | 3 | 1 | 3 | 3 | 3 | 3 | 3 |
| (θ2 − θ1) − (θ3 − θ2) (°) |  | 0 | 0 | 1 | 3 | 5 | 3 | 3 | 3 | 3 | 3 |
| Wg/Wf | Wg/Wf ≥ 1.03 | 0.98 | 0.98 | 0.98 | 0.98 | 0.98 | 1.03 | 1.05 | 1.08 | 1.05 | 1.05 |
| D1 (mm) |  | 0.5 | 0.5 | 0.5 | 0.5 | 0.5 | 0.5 | 0.5 | 0.5 | 0.5 | 0.5 |
| D2 (mm) | D1 < D2 < D3 | 1.0 | 1.0 | 1.0 | 1.0 | 1.0 | 1.0 | 1.0 | 1.0 | 1.0 | 1.0 |
| D3 (mm) |  | 0.8 | 0.8 | 0.8 | 0.8 | 0.8 | 0.8 | 0.8 | 0.8 | 1.5 | 2.0 |
| D3/D2 | Do/Dm ≥ 1.5 | 0.8 | 0.8 | 0.8 | 0.8 | 0.8 | 0.8 | 0.8 | 0.8 | 1.5 | 2.0 |
| So/Si | So/Si ≥ 1.01 | − | − | − | − | − | − | − | − | − | − |
| L/We | 1.2 ≤ L/We ≤ 2.0 | 1.6 | 1.6 | 1.6 | 1.6 | 1.6 | 1.6 | 1.6 | 1.6 | 1.6 | 1.6 |
| UNEVEN WEAR RESISTANCE PERFORMANCE | − | 100 | 105 | 106 | 107 | 106 | 110 | 111 | 111 | 113 | 115 |

FIG. 19

| | SPECIFIED RANGE | EXAMPLE 110 | EXAMPLE 111 | EXAMPLE 112 | EXAMPLE 113 | EXAMPLE 114 | EXAMPLE 115 | EXAMPLE 116 | EXAMPLE 117 | EXAMPLE 118 |
|---|---|---|---|---|---|---|---|---|---|---|
| CIRCUMFERENTIAL BELT | YES | YES | YES | YES | YES | YES | YES | YES | YES | YES |
| $\theta_1$ (°) | $\theta_1 < \theta_2 < \theta_3$ | 60 | 60 | 60 | 60 | 60 | 60 | 60 | 60 | 60 |
| $\theta_2$ (°) | | 66 | 66 | 66 | 66 | 66 | 66 | 66 | 66 | 66 |
| $\theta_3$ (°) | | 69 | 69 | 69 | 69 | 69 | 69 | 69 | 69 | 69 |
| $\theta_2 - \theta_1$ (°) | $\theta_2 - \theta_1 > \theta_3 - \theta_2$ | 6 | 6 | 6 | 6 | 6 | 6 | 6 | 6 | 6 |
| $\theta_3 - \theta_2$ (°) | | 3 | 3 | 3 | 3 | 3 | 3 | 3 | 3 | 3 |
| $(\theta_2 - \theta_1) - (\theta_3 - \theta_2)$ (°) | | 3 | 3 | 3 | 3 | 3 | 3 | 3 | 3 | 3 |
| $W_g/W_f$ | $W_g/W_f \geq 1.03$ | 1.05 | 1.05 | 1.05 | 1.05 | 1.05 | 1.05 | 1.05 | 1.05 | 1.05 |
| $D_1$ (mm) | | 0.5 | 0.5 | 0.5 | 0.5 | 0.5 | 0.5 | 0.5 | 0.5 | 0.5 |
| $D_2$ (mm) | $D_1 < D_2 < D_3$ | 1.0 | 1.0 | 1.0 | 1.0 | 1.0 | 1.0 | 1.0 | 1.0 | 1.0 |
| $D_3$ (mm) | | 2.5 | 2.5 | 2.5 | 2.5 | 2.5 | 2.5 | 2.5 | 2.5 | 2.5 |
| $D_3/D_2$ | $D_o/D_m \geq 1.5$ | 2.5 | 2.5 | 2.5 | 2.5 | 2.5 | 2.5 | 2.5 | 2.5 | 2.5 |
| $S_o/S_i$ | $S_o/S_i \geq 1.01$ | - | 1.01 | 1.03 | 1.05 | 1.10 | 1.10 | 1.10 | 1.10 | 1.10 |
| $L/W_e$ | $1.2 \leq L/W_e \leq 2.0$ | 1.6 | 1.6 | 1.6 | 1.6 | 1.6 | 1.2 | 2.0 | 1.0 | 2.5 |
| UNEVEN WEAR RESISTANCE PERFORMANCE | - | 115 | 117 | 118 | 119 | 120 | 119 | 118 | 117 | 115 |

FIG. 20

PNEUMATIC TIRE

RELATED APPLICATIONS

This application is a divisional of U.S. patent application Ser. No. 16/087,611, filed on Sep. 21, 2018, which is the National Stage of International Patent Application No. PCT/JP2017/004694, filed on Feb. 9, 2017, which claims the benefit of priority from Japan Patent Application No. 2016-071205, filed on Mar. 31, 2016 and Japan Patent Application No. 2016-150190, filed on Jul. 29, 2016.

TECHNICAL FIELD

The present technology relates to a pneumatic tire.

BACKGROUND ART

In a typical tire, uneven wear is caused by high amounts of pressure acting on the tire when it comes into contact with the ground. Thus, ground contact pressure needs to be appropriately alleviated.

A known pneumatic tire, for example the pneumatic tire described in Japan Patent Publication No. 2003-182315, is designed to improve steering stability on snow in a travel-worn stage without decreasing dry steering stability. This pneumatic tire includes, in a road contact surface portion of a tread portion, a plurality of main grooves extending in a circumferential direction, and a block defined by lateral grooves that cross the main grooves. The block includes sipes and a pair of acute angle block corner portions on opposite sides in the circumferential direction. The blocks further include a pair of small blocks defined by the pair of acute angle block corner portions and two of the sipes and a central block disposed between the small blocks, the central block being larger than the small blocks.

The pneumatic tire described in Japan Patent Publication No. 2008-260343, for example, includes, in a belt layer, a small-angle belt including cords inclined at an angle ranging from 5° to 30° with respect to a tire circumferential direction and a large-angle belt including cords inclined at an angle ranging from 45° to 90° with respect to the tire circumferential direction.

The pneumatic tire described in Japan Patent Publication No. 2015-174469, for another example, includes a belt layer with a multilayer structure including a pair of cross belt layers and a circumferential belt.

The rigidity of blocks and ribs is reduced by narrow grooves and slits such as sipes being formed. This may lead to separation and chipping.

SUMMARY

The present technology provides a pneumatic tire that can provide improved uneven wear resistance performance while maintaining durability performance by alleviating ground contact pressure without reducing block rigidity.

A heavy duty pneumatic tire mountable on a truck or bus, especially a pneumatic tire with a low aspect ratio, may include a small-angle belt such as that in Japan Patent Publication No. 2008-260343 or a circumferential belt such as that in Japan Patent Publication No. 2015-174469 (referred to below collectively as "circumferential belt" to retain the shape of the tread portion.

In the tire equatorial plane region where the circumferential belt is disposed, the circumferential belt provides high circumferential rigidity, thus allowing radial growth to be suppressed when the tire is new and thereafter. However, the regions outward from the circumferential belt in the tire lateral direction experience high radial growth due to circumferential rigidity being relatively low compared to that of the region at or near the tire equatorial plane. This causes uneven wear.

In light of the foregoing, the present technology provides a pneumatic tire that can provide improved uneven wear resistance performance even with a configuration including a circumferential belt.

A pneumatic tire according to an aspect of the present technology includes two circumferential grooves, in a tread surface of a tread portion, disposed in alignment in a tire lateral direction extending in a tire circumferential direction, a plurality of lateral grooves, in the tread surface, disposed in alignment in the tire circumferential direction extending to cross the tire circumferential direction, the plurality of lateral grooves communicating at both ends with both of the circumferential grooves and defining a block-shaped land portion each between the circumferential grooves, a narrow groove, in the tread surface of the land portion, disposed in alignment in the tire lateral direction extending in the tire circumferential direction, the narrow groove communicating at both ends with a respective lateral groove of the plurality of lateral grooves and dividing, in the tire lateral direction, the land portion defined by each of the circumferential grooves and each of the lateral grooves into a plurality of small land portions, wherein the two narrow grooves are formed in the land portion having a smaller groove width than the circumferential grooves and each including a bent portion in an intermediate portion, the bent portion being disposed inward in the tire lateral direction in a direction the narrow grooves oppose one another from an imaginary straight line connecting ends of the respective narrow grooves, and bend points of the bent portions being disposed at positions offset from one another in the tire circumferential direction.

According to the pneumatic tire, each of the land portions defined by the circumferential grooves and the lateral grooves are divided by the two narrow grooves to form small land portions. This results in lower rigidity, which allows the ground contact pressure when the tread portion comes into contact with the ground to be alleviated. Additionally, the length of the narrow grooves is increased by the bent portions formed in the narrow grooves. This further results in lower rigidity, which allows the ground contact pressure to be further alleviated. Thus, uneven wear resistance performance can be improved. Furthermore, according to the pneumatic tire, the bent portion is disposed inward in the tire lateral direction in the direction the two narrow grooves oppose one another from the imaginary straight line connecting the ends of the narrow groove. As a result, a reduction in the area of the side small land portions on the tread surface is suppressed, and a decrease in rigidity is prevented. Moreover, the bend points of the two narrow grooves are located offset from each other in the tire circumferential direction so that localized narrowing of the central small land portion is suppressed, and thus, a decrease in rigidity is prevented. Thus, separation and chipping of the land portion can be suppressed. As a result, according to the pneumatic tire, uneven wear resistance performance can be improved while maintaining durability performance by suppressing separation and chipping.

In the pneumatic tire according to an aspect of the present technology, preferably the bent portion of the narrow groove has a bend angle ranging from 90° to 160°.

According to the pneumatic tire, when the bend angle of the bent portion is 90° or greater, the bend becomes less sharp. As a result, separation and chipping is less likely to occur and the effect of maintaining durability is great. When the bending angle of the bent portion is 160° or less, the length of the narrow grooves is increased, and the effect of reducing rigidity is great.

In the pneumatic tire according to an aspect of the present technology, preferably a relative shift width Lc in the tire circumferential direction of each of the bend point of the two narrow grooves and a tire circumferential direction dimension L of the land portion in which the narrow grooves are formed satisfy $0.1 \leq Lc/L$.

According to the pneumatic tire, by satisfying $0.1 \leq Lc/L$, localized narrowing of the central small land portion between the two narrow grooves is further suppressed, and a decrease in rigidity can be further prevented. As a result, the effect of maintaining durability performance is great.

In the pneumatic tire according to an aspect of the present technology, preferably the lateral groove is formed extending at an incline with respect to the tire lateral direction, with an angle with respect to the tire lateral direction ranging from 5° to 50°.

According to the pneumatic tire, when the angle of the lateral groove with respect to the tire lateral direction is greater than 5°, the length of the lateral groove is increased and the effect of reducing rigidity is great. When the angle of the lateral groove is 50° or less, the angle is prevented from being sharp. As a result, separation and chipping is less likely to occur and the effect of maintaining durability is great.

In the pneumatic tire according to an aspect of the present technology, preferably relationships Ha>Hb, and Ha>Hc are satisfied, where Ha is a groove depth of the circumferential grooves, Hb is a groove depth of the lateral grooves, and Hc is a groove depth of the narrow grooves.

According to the pneumatic tire, the groove depth Hb of the lateral grooves and the groove depth Hc of the narrow grooves are less than the groove depth Ha of the circumferential grooves so that a decrease in rigidity of the land portion in the tire circumferential direction is suppressed. Thus, the effect of maintaining durability is great.

In the pneumatic tire according to an aspect of the present technology, preferably Hb ranges from 1 mm to 5 mm and Hc ranges from 1 mm to 5 mm, where Hb is a groove depth of the lateral grooves and Hc is a groove depth of the narrow grooves.

According to the pneumatic tire, the groove depth Hb of the lateral grooves and the groove depth Hc of the narrow grooves range from 1 mm to 5 mm to suppress a decrease in rigidity of the land portions. As a result, the effect of maintaining durability is great.

In the pneumatic tire according to an aspect of the present technology, preferably the lateral grooves are formed extending at an incline with respect to the tire lateral direction; and a chamfer is formed in a corner portion of the land portion with an acute angle with respect to the tire circumferential direction.

According to the pneumatic tire, by providing the chamfer, separation and chipping are less likely to occur and the effect of maintaining durability is great.

The pneumatic tire according to an aspect of the present technology preferably further includes a sipe, in the tread surface, communicating at one end with one of the circumferential grooves and terminating at another end within the land portion; and preferably relationships 0.3 mm$\leq$Wd$\leq$2.0 mm, $0.3 \leq Hd/Ha \leq 1.0$, and $0.03 \leq Ld/We \leq 0.2$ are satisfied, where Wd is a groove width of the sipe, Hd is a groove depth of the sipe, Ld is a groove length of the sipe, We is a tire lateral direction dimension of the land portion, and Ha is a groove depth of the circumferential grooves.

According to the pneumatic tire, the sipe reduces the rigidity of the land portion so that ground contact pressure is alleviated. As a result, the effect of improving uneven wear resistance performance is great.

A pneumatic tire according to an aspect of the present technology includes a circumferential belt, in a tread portion, disposed in a tire lateral direction encompassing a position of a tire equatorial plane including cords extending in a tire circumferential direction disposed in alignment in a tire lateral direction, a plurality of circumferential grooves, in a tread surface of the tread portion, disposed in alignment in the tire lateral direction extending in the tire circumferential direction, including a central circumferential groove disposed on the tire equatorial plane, outer circumferential grooves disposed outermost in the tire lateral direction, and intermediate circumferential grooves disposed between the central circumferential groove and the outer circumferential grooves, a land portion disposed between the central circumferential groove and one of the outer circumferential grooves being divided into at least three in the tire lateral direction by the intermediate circumferential grooves; and a plurality of lateral grooves, in each of the land portions, disposed in alignment in the tire lateral direction at an incline with respect to the tire circumferential direction, opening at both ends to the circumferential grooves adjacent in the tire lateral direction, wherein an inclination angle of an acute angle of the lateral grooves with respect to the tire circumferential direction is smallest in the land portion closest to the tire equatorial plane and is larger in the land portion as it goes to the tire lateral direction outer side.

According to the pneumatic tire, by the inclination angles of the acute angles of the lateral grooves with respect to the tire circumferential direction being configured as such, the rigidity of the land portion closest to the tire equatorial plane is reduced, and the rigidity of the land portion is progressively higher going outward in the tire lateral direction. Thus, the rigidity difference between the tire equator surface region and the outer region in the tire lateral direction caused by the circumferential belt is suppressed while obtaining the effect of suppressing the radial growth when the tire is new and thereafter by increasing the circumferential rigidity by using the circumferential belt. As a result, the circumferential rigidity of the tread portion across the tire lateral direction can be made uniform and uneven wear can be suppressed, thus the improved uneven wear resistance performance can be provided even with a configuration including the circumferential belt.

In the pneumatic tire according to an aspect of the present technology, preferably the lateral grooves between the two of the land portions adjacent in the tire lateral direction have a difference in the inclination angle being larger as it goes closer to the tire equatorial plane and smaller as it goes closer to the tire lateral direction outer side.

According to the pneumatic tire, the difference between the inclination angles of the acute angles of the lateral grooves with respect to the tire circumferential direction in the two land portions adjacent in the tire lateral direction corresponds to the difference in rigidity between the two adjacent land portions. By the difference between the inclination angles of the acute angles of the lateral grooves with respect to the tire circumferential direction being larger as it goes closer to the tire equatorial plane and smaller as it goes closer to the tire lateral direction outer side, the difference in rigidity between the land portions adjacent in the tire lateral direction is larger towards the tire equatorial plane. This allows excessive circumferential rigidity in the tire equatorial plane region caused by the circumferential belt to be suppressed. As a result, the circumferential rigidity of the tread portion across the tire lateral direction can further be made uniform and uneven wear can be suppressed, thus the effect of significantly improving uneven wear resistance performance can be provided even with a configuration including the circumferential belt.

In the pneumatic tire according to an aspect of the present technology, preferably a center region being a region defined between the outer circumferential grooves, a tire lateral direction dimension Wf of the center region and a tire lateral direction dimension Wg of the circumferential belt satisfy a relationship Wg/Wf≥1.03.

In the region outward of the circumferential belt in the tire lateral direction, circumferential rigidity is not high, thus, in this region, it is not necessary to make rigidity uniform by using the inclination angles of the acute angles of the lateral grooves with respect to the tire circumferential direction. As a result, the center region is preferably disposed within the range of the circumferential belt.

In the pneumatic tire according to an aspect of the present technology, preferably when the pneumatic tire is mounted on a regular rim, inflated to a regular internal pressure, and in an unloaded state, a difference in tire radial direction dimension between both ends in the tire lateral direction of the land portions is smaller as it goes closer to the tire equatorial plane and larger as it goes closer to the tire lateral direction outer side, and a difference in tire radial direction dimension Do of the land portion located outermost in the tire lateral direction and a difference in tire radial direction dimension Dm of the land portion adjacent thereto inward in the tire lateral direction satisfy the relationship Do/Dm≥1.5.

According the pneumatic tire, the circumferential rigidity is smaller the smaller the difference in tire radial direction dimension between both ends in the tire lateral direction of the land portion, and on the contrary the circumferential rigidity is larger the larger the difference. Also, in relation to the difference in tire radial direction dimension Do of the land portion outermost in the tire lateral direction and the difference in tire radial direction dimension Dm of the land portion adjacent thereto inward in the tire lateral direction, the difference in rigidity is larger the larger the difference in tire radial direction dimension Do located outward in the tire lateral direction. Accordingly, as the circumferential rigidity is decreased in the land portions against the increase of the circumferential rigidity in the tire equatorial plane region by the circumferential belt, the circumferential rigidity is increased in the land portions against the decrease of the circumferential rigidity in the region outward from the circumferential belt, and the difference in rigidity of the land portions in the outer regions in the tire lateral direction are specified by the relationship Do/Dm, a difference in circumferential rigidity in the tire lateral direction in the land portions caused by the circumferential belt can be suppressed. As a result, the circumferential rigidity of the tread portion across the tire lateral direction can further be made uniform and uneven wear can be suppressed, thus the effect of significantly improving uneven wear resistance performance can be provided even with a configuration including the circumferential belt.

In the pneumatic tire according to an aspect of the present technology, preferably the land portion is formed to have a plurality of blocks defined by the two circumferential grooves adjacent in the tire lateral direction and the two lateral grooves adjacent in the tire circumferential direction, the blocks are divided in the tire lateral direction to form small blocks by a narrow groove that opens at both ends to two of the lateral grooves adjacent in the tire circumferential direction, and in the plurality of blocks, a surface area $S_I$ of the small block closest to the tire equatorial plane and a surface area $S_O$ of the small block closest to the tire lateral direction outer side satisfy a relationship $S_O/S_I$≥1.01.

According to the pneumatic tire, in the blocks, by configuring the surface area $S_O$ of the small block located closest to the tire lateral direction outer side being greater than the surface area $S_I$ of the small block closest to the tire equatorial plane, the rigidity on the side closer to the tire lateral direction outer side in the block can be increased. As a result, the circumferential rigidity of the tread portion across the tire lateral direction can further be made uniform and uneven wear can be suppressed, thus the effect of significantly improving uneven wear resistance performance can be provided even with a configuration including the circumferential belt.

In the pneumatic tire according to an aspect of the present technology, preferably the land portion is formed to have a plurality of blocks defined by the two circumferential grooves adjacent in the tire lateral direction and the two lateral grooves adjacent in the tire circumferential direction, and an aspect ratio of a tire circumferential direction dimension L and a tire lateral direction dimension We of each of the blocks satisfies 1.2≤L/We≤2.0.

According to the pneumatic tire, the aspect ratio of the tire circumferential direction dimension L of the block and the tire lateral direction dimension We is configured to be in the range described above to make it easier for the block to have a difference in rigidity.

The present technology can provide improved uneven wear resistance performance while maintaining durability performance.

The present technology can provide improved uneven wear resistance performance even with a configuration including a circumferential belt.

BRIEF DESCRIPTION OF DRAWINGS

FIG. 7 is a table listing the results of performance tests of pneumatic tires according to first examples of the present technology.

FIG. 8 is a table listing the results of performance tests of pneumatic tires according to first examples of the present technology.

FIG. 19 is a table listing the results of performance tests on pneumatic tires according to second examples of the present technology.

FIG. 20 is a table listing the results of performance tests on pneumatic tires according to second examples of the present technology.

DETAILED DESCRIPTION

First Embodiment

A first embodiment of the present technology is described in detail below with reference to the drawings. However, the present technology is not limited by the first embodiment. Constituents of the first embodiment include elements that are essentially identical or that can be substituted or easily conceived by a person skilled in the art. Furthermore, the modified examples described for the first embodiment can be combined as desired within the scope apparent to those skilled in the art.

Figure 1:
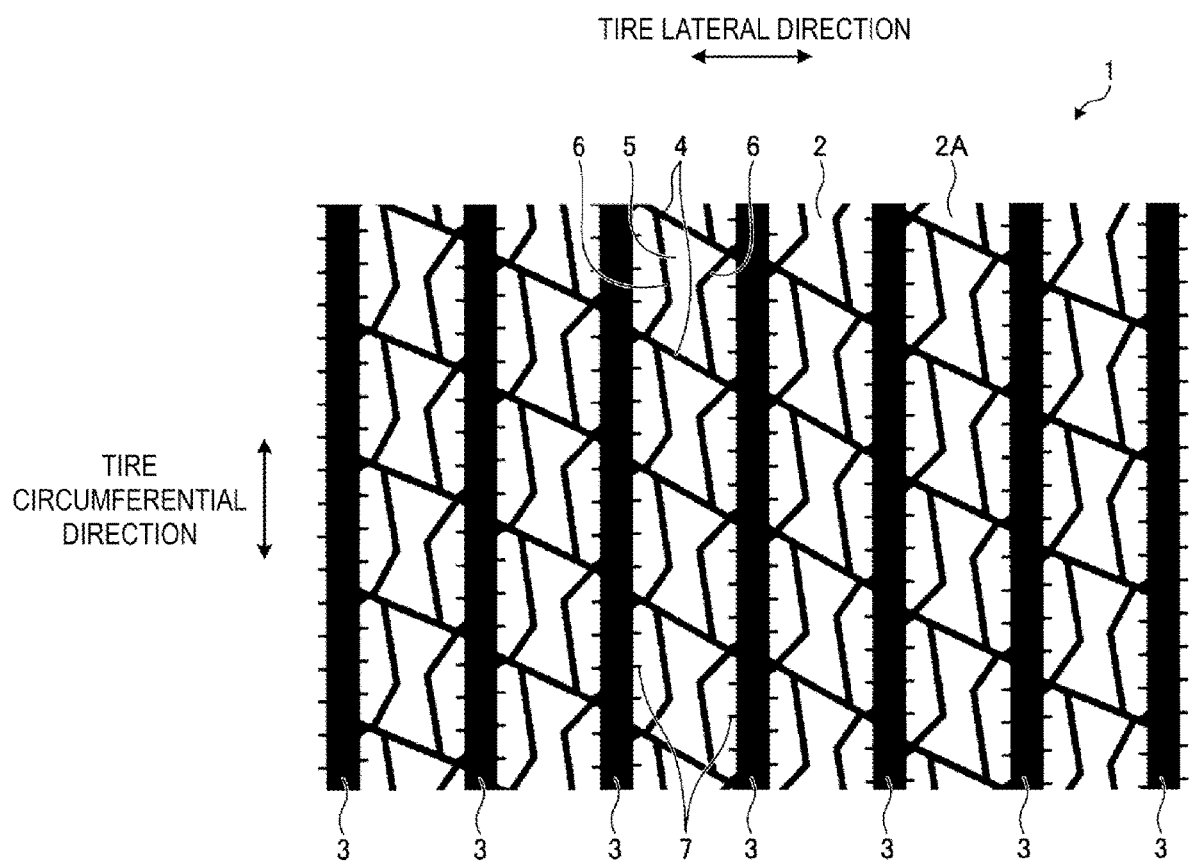
FIG. 1 is a plan view of a tread portion of a pneumatic tire according to a first embodiment of the present technology.
Figure 2:
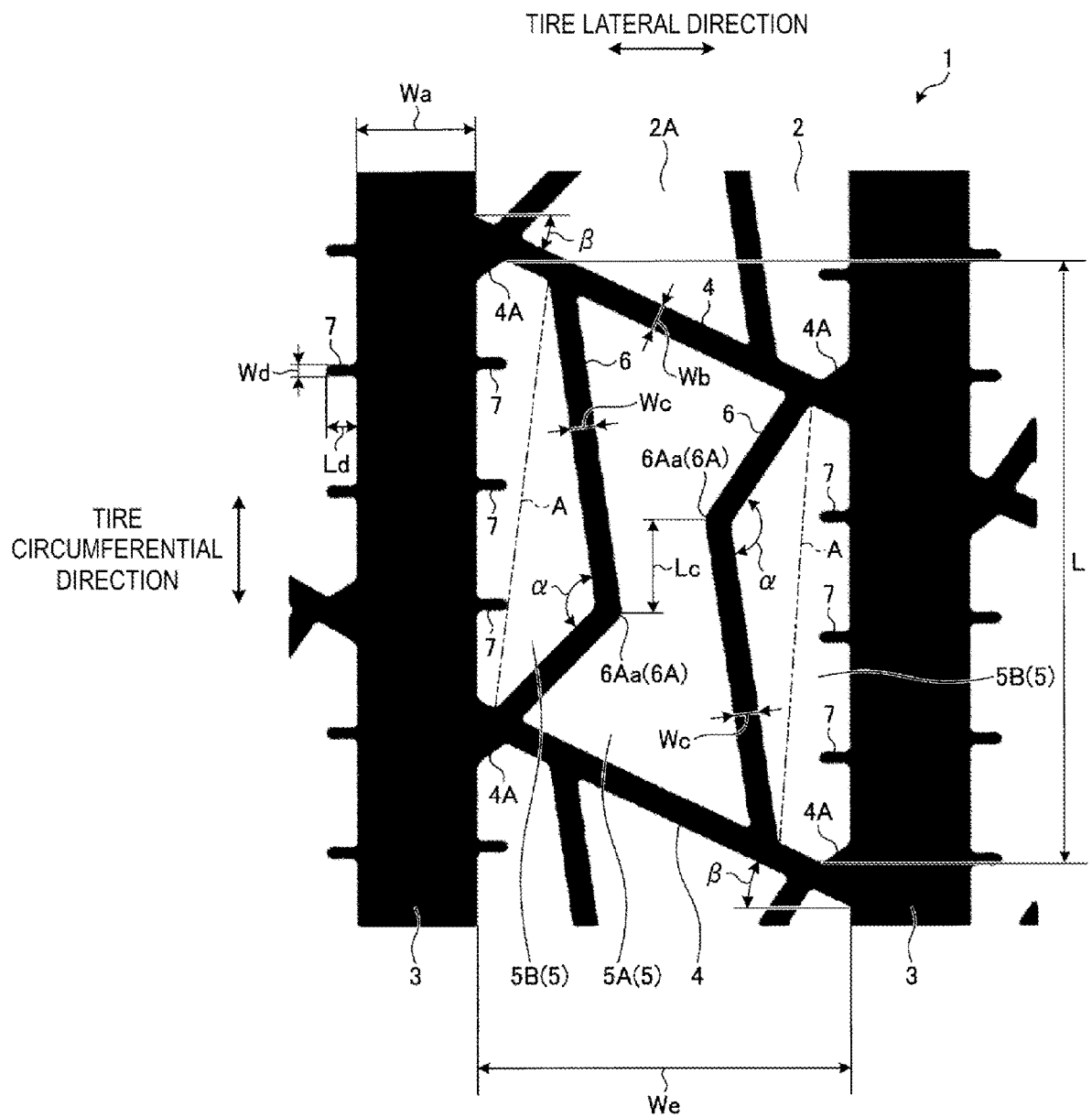
FIG. 2 is an enlarged view of the tread portion of the pneumatic tire according to a first embodiment of the present technology.
Figure 3:
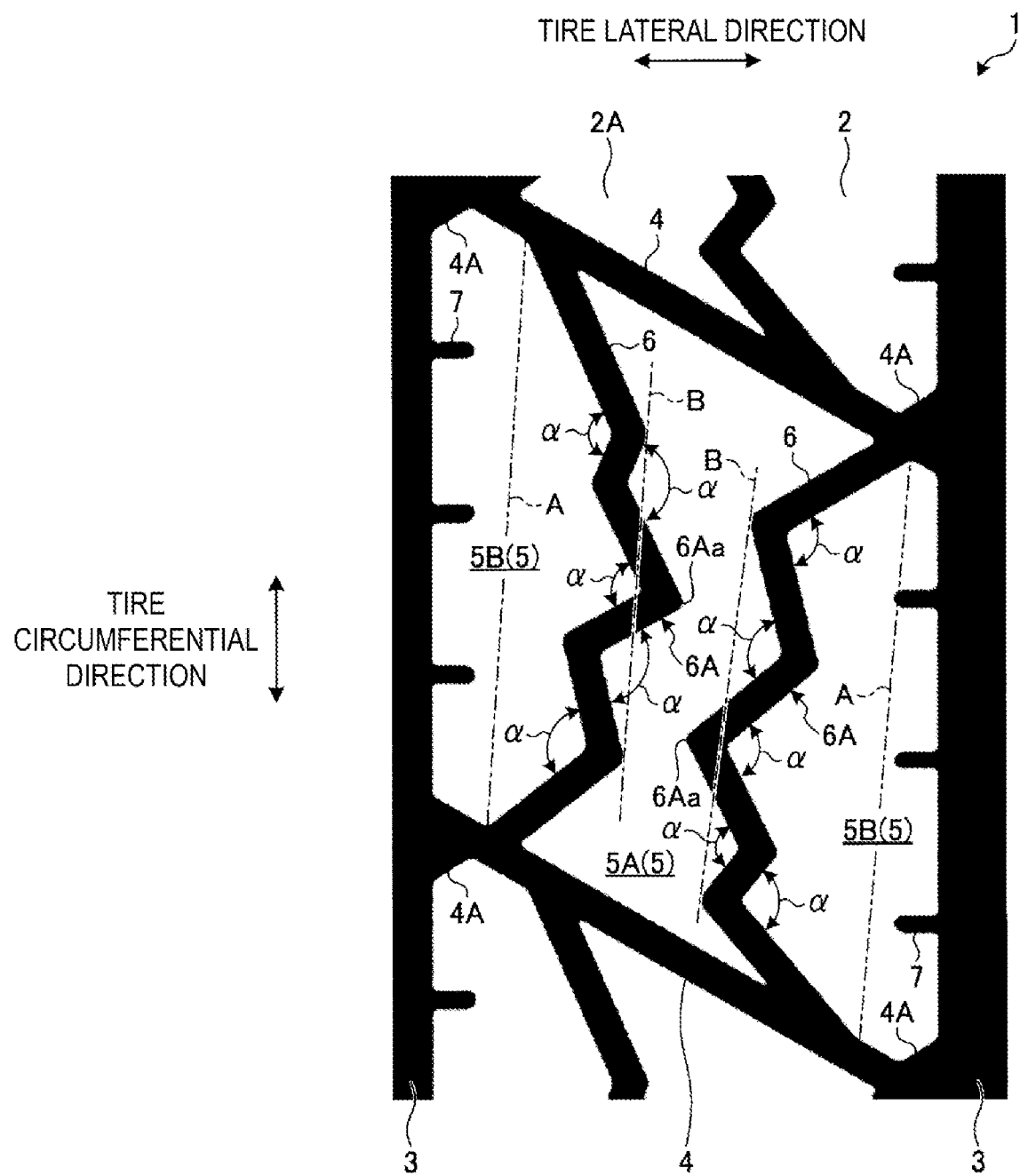
FIG. 3 is an enlarged view of another tread portion of the pneumatic tire according to a first embodiment of the present technology.
Figure 4:
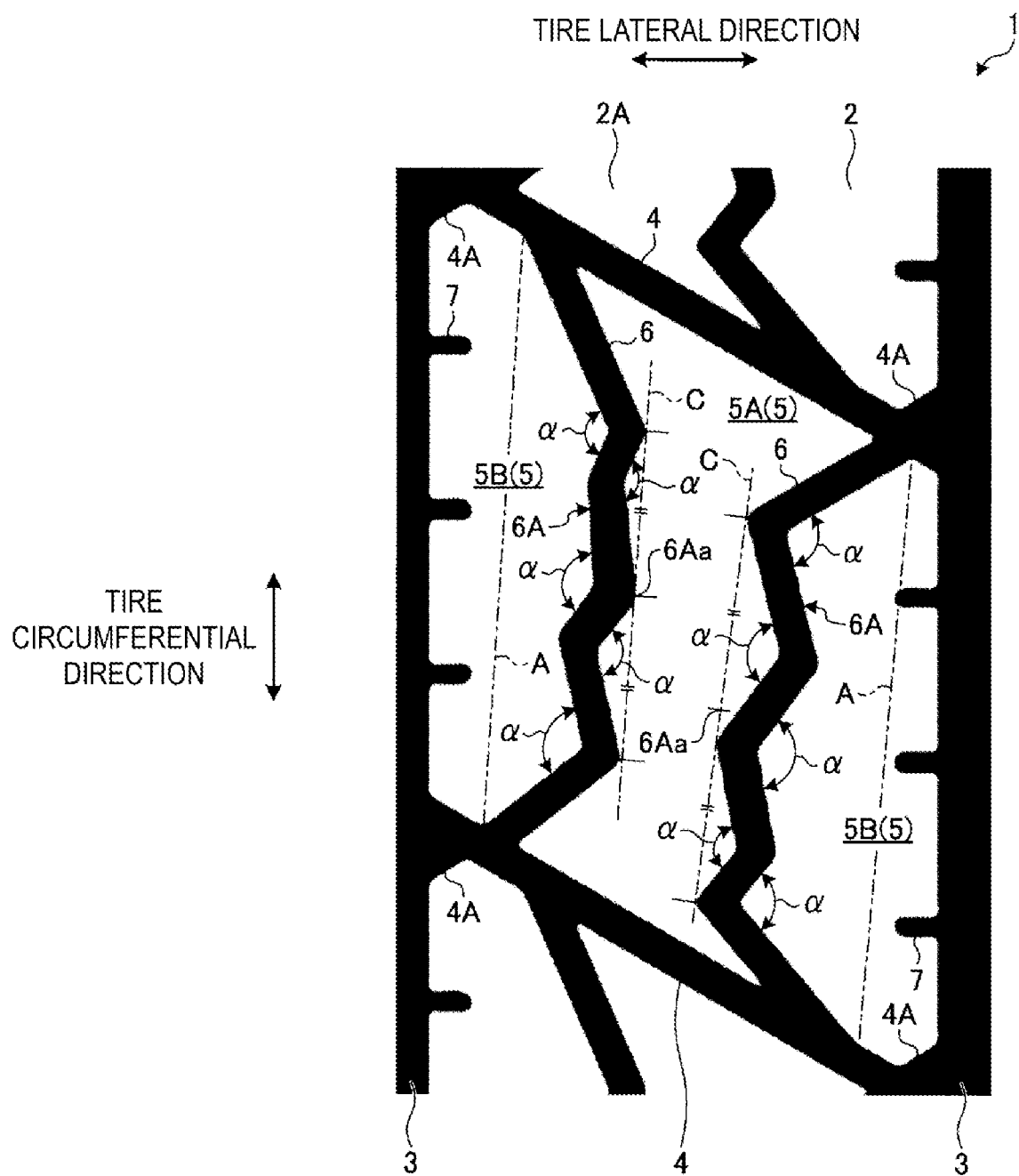
FIG. 4 is an enlarged view of another tread portion of the pneumatic tire according to a first embodiment of the present technology.
Figure 5:
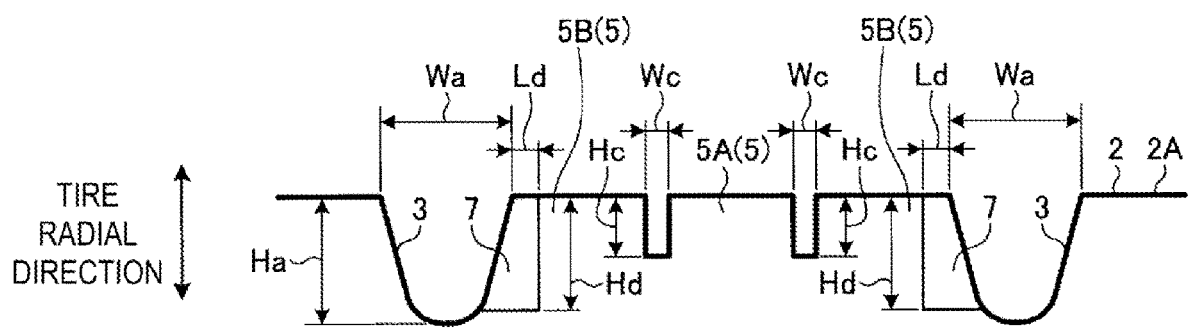
FIG. 5 is an enlarged cross-sectional view of the tread portion of the pneumatic tire according to a first embodiment of the present technology.
Figure 6:
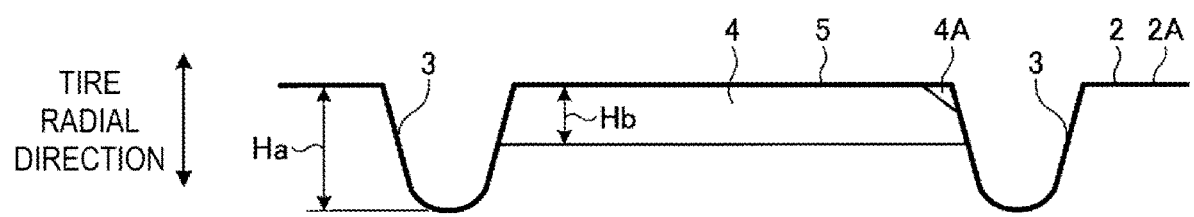
FIG. 6 is an enlarged cross-sectional view of the tread portion of the pneumatic tire according to a first embodiment of the present technology.

FIG. 1 is a plan view of a tread portion of a pneumatic tire according to the first embodiment. FIG. 2 is an enlarged view of the tread portion of the pneumatic tire according to the first embodiment. FIG. 3 is an enlarged view of another tread portion of the pneumatic tire according to the first embodiment. FIG. 4 is an enlarged view of another tread portion of the pneumatic tire according to the first embodiment. FIG. 5 is an enlarged cross-sectional view of the tread portion of the pneumatic tire according to the first embodiment. FIG. 6 is an enlarged cross-sectional view of the tread portion of the pneumatic tire according to the first embodiment.

Hereinafter, "tire circumferential direction" refers to the circumferential direction with the rotation axis (not illustrated) of a pneumatic tire 1 as the center axis. Additionally, "tire lateral direction" refers to the direction parallel with the rotation axis. "Inward in the tire lateral direction" refers to the direction toward a tire equatorial plane (not illustrated) in the tire lateral direction. "Outward in the tire lateral direction" refers to the direction away from the tire equatorial plane in the tire lateral direction. "Tire radial direction" refers to the direction orthogonal to the rotation axis. "Inward in the tire radial direction" refers to the direction toward the rotation axis in the tire radial direction. "Outward in the tire radial direction" refers to the direction away from the rotation axis in the tire radial direction. "Tire equatorial plane" is the plane orthogonal to the rotation axis that passes through the center of the tire width of the pneumatic tire 1.

As illustrated in FIG. 1, the pneumatic tire 1 of the first embodiment includes a tread portion 2. The tread portion 2 is made of a rubber material and exposed on the outermost side of the pneumatic tire 1 in the tire radial direction, with the surface thereof, i.e., a tread surface 2A, constituting the profile of the pneumatic tire 1.

The tread surface 2A of the tread portion 2 includes a plurality of circumferential grooves 3 (seven in the first embodiment illustrated in FIG. 1) extending in the tire circumferential direction and disposed in alignment in the tire lateral direction. Circumferential groove 3 refers to a groove having, for example, a groove width (Wa in FIGS. 2 and 5) from 8 mm to 15 mm and a groove depth (dimension from the opening position on the tread surface 2A to the groove bottom, Ha in FIGS. 5 and 6) from 10 mm to 28 mm.

Additionally, the tread portion 2 includes, in the tread surface 2A, ribs extending in the tire circumferential direction defined by adjacent circumferential grooves 3. The tread portion 2 includes, in the tread surface 2A, a plurality of lateral grooves 4 disposed in alignment in the tire circumferential direction, extending in the tire lateral direction and crossing the tire circumferential direction. The lateral grooves 4 communicate with the circumferential grooves 3 at both ends. Accordingly, each rib defined by the circumferential grooves 3 is divided by the lateral grooves 4 to form block-shaped land portions 5 defined between the circumferential grooves 3. Lateral groove 4 refers to a groove having, for example, a groove width (Wb in FIG. 2) from 1 mm to 4 mm and a groove depth (dimension from the opening position on the tread surface 2A to the groove bottom, Hb in FIG. 6) from 1 mm to 5 mm.

Additionally, the tread portion 2 includes, in each land portion 5 of the tread surface 2A defined by the circumferential grooves 3 and the lateral grooves 4, two independent narrow grooves 6 extending in the tire circumferential direction disposed in alignment without meeting in the tire lateral direction. The narrow grooves 6 communicate with the lateral grooves 4 at both ends. Accordingly, each land portion 5 defined by the circumferential grooves 3 and the lateral grooves 4 is divided plurally in the tire lateral direction by the narrow grooves 6. Thus, a central small land portion 5A and two side small land portions 5B are formed in each land portion 5. The central small land portion 5A is defined by the lateral grooves 4 and the narrow grooves 6, and the side small land portions 5B are defined by the circumferential groove 3, the lateral grooves 4, and the narrow groove 6. Narrow groove 6 refers to a groove having, for example, a groove width (Wc in FIGS. 2 and 5) from 1 mm to 4 mm and a groove depth (dimension from the opening position on the tread surface 2A to the groove bottom, Hc in FIG. 5) from 1 mm to 5 mm.

The groove width Wc of the two narrow grooves 6 in each of the land portions 5 is less than the groove width Wa of the circumferential grooves 3. A bent portion 6A is formed in an intermediate portion of the narrow grooves 6. The bent portion 6A is disposed inward in the tire lateral direction in the direction the two narrow grooves 6 oppose one another in the tire lateral direction from an imaginary straight line A connecting the ends of the narrow groove 6. Furthermore, the narrow grooves 6 are disposed with bend points 6Aa of the bent portions 6A located offset from each other in the tire circumferential direction.

As illustrated in FIG. 2, in a configuration in which each narrow groove 6 is formed with the bent portion 6A and bends once, the bend points 6Aa are the single bending point located inward in the tire lateral direction in the direction the two narrow grooves 6 oppose one another in the tire lateral direction.

As illustrated in FIG. 3, in a configuration in which each narrow groove 6 is formed with a plurality of the bent portions 6A and bends a plurality of times, the bend point 6Aa is the bending point located furthest inward in the tire lateral direction in the direction the two narrow grooves 6 oppose one another in the tire lateral direction (inward from a reference straight line B in the direction the two narrow grooves 6 oppose one another).

As illustrated in FIG. 4, in a configuration in which each narrow groove 6 is formed with a plurality of the bent portions 6A and bends a plurality of times and a plurality of bend points are located furthest inward in the tire lateral direction in the direction the two narrow grooves 6 oppose one another in the tire lateral direction, the bend point 6Aa is a center point of a reference straight line C that connects the bending points located furthest inward at each end in the tire circumferential direction. In such a configuration, as illustrated in FIG. 4, the bend point 6Aa may not correspond to a bending point.

According to the pneumatic tire 1 of the first embodiment with such a configuration, each of the land portions 5 defined by the circumferential grooves 3 and the lateral grooves 4 are divided by the two narrow grooves 6 to form the central small land portion 5A and the two side small land portions 5B. This results in lower rigidity, which allows the ground contact pressure when the tread portion 2 comes into contact with the ground to be alleviated. Additionally, the length of each of the narrow grooves 6 is increased by having the bent portions 6A formed in the narrow grooves 6. This further results in lower rigidity, which allows the ground contact pressure to be further alleviated. Thus, uneven wear resistance performance can be improved.

Furthermore, according to the pneumatic tire 1 of the first embodiment, the bent portion 6A is disposed inward in the tire lateral direction in the direction the two narrow grooves 6 oppose one another from the imaginary straight line A connecting the ends of the narrow groove 6. As a result, a reduction in the area of the side small land portions 5B on the tread surface 2A is suppressed, and a decrease in rigidity is prevented. Moreover, the bend points 6Aa of the two narrow grooves 6 are located offset from each other in the tire circumferential direction so that localized narrowing of the central small land portion 5A is suppressed, and thus, a decrease in rigidity is prevented. Thus, separation and chipping of the land portion 5 can be suppressed.

As a result, according to the pneumatic tire 1 of the first embodiment, uneven wear resistance performance can be improved while maintaining durability performance by suppressing separation and chipping.

In the pneumatic tire 1 of the first embodiment, a bend angle α of the bent portion 6A of the narrow groove 6 preferably ranges from 90° to 160°. As illustrated in FIGS. 2 to 4, the bend angle α is the smaller angle of the bend at the bent portion 6A.

According to the pneumatic tire 1, when the bend angle α of the bent portion 6A is 90° or greater, the bend becomes less sharp. As a result, separation and chipping is less likely to occur and the effect of maintaining durability is great. When the bending angle α of the bent portion 6A is 160° or less, the length of the narrow grooves 6 is increased, and the effect of reducing rigidity is great.

As illustrated in FIG. 2, in the pneumatic tire 1 of the first embodiment, $0.1 \leq Lc/L$ is preferably satisfied, where Lc is the shift width of the bend points 6Aa of the two narrow grooves 6 in the tire circumferential direction and L is the tire circumferential direction dimension of the land portion 5 in which the narrow grooves 6 are formed. The maximum value of the shift width Lc is within a range of the imaginary straight line A or less.

According to the pneumatic tire 1, by satisfying $0.1 \leq Lc/L$, localized narrowing of the central small land portion 5A between the two narrow grooves 6 is further suppressed, and a decrease in rigidity can be further prevented. As a result, the effect of maintaining durability performance is great.

Additionally, according to the pneumatic tire 1 of the first embodiment, the lateral grooves 4 are formed extending at an incline with respect to the tire lateral direction. An angle β with respect to the tire lateral direction preferably ranges from 5° to 50°.

According to the pneumatic tire 1, when the angle β of the lateral grooves 4 with respect to the tire lateral direction is greater than 5°, the length of the lateral grooves 4 is increased and the effect of reducing rigidity is great. When the angle β of the lateral grooves 4 with respect to the tire lateral direction is 50° or less, the angle is prevented from being sharp. As a result, separation and chipping is less likely to occur and the effect of maintaining durability is great.

Note that in the pneumatic tire 1 of the first embodiment, the lateral grooves 4, in a rib defined by adjacent circumferential grooves 3, are inclined in the same direction with respect to the tire lateral direction. Additionally, in the pneumatic tire 1 of the first embodiment, the lateral grooves 4, in adjacent ribs, are also inclined in the same direction with respect to the tire lateral direction. In such a configuration, each of the land portions 5 are uniform in shape, which contributes to improving uneven wear resistance performance.

In the pneumatic tire 1 of the first embodiment, the relationships Ha>Hb, and Ha>Hc are preferably satisfied, where Ha is the groove depth of the circumferential grooves 3, Hb is the groove depth of the lateral grooves 4, and Hc is the groove depth of the narrow grooves 6.

According to the pneumatic tire 1, the groove depth Hb of the lateral grooves 4 and the groove depth Hc of the narrow grooves 6 are less than the groove depth Ha of the circumferential grooves 3 so that a decrease in rigidity of the land portion 5 in the tire circumferential direction is suppressed. Thus, the effect of maintaining durability is great.

In the pneumatic tire 1 of the first embodiment, Hb is preferably from 1 mm to 5 mm and Hc is preferably from 1 mm to 5 mm, where Hb is the groove depth of the lateral grooves 4 and Hc is the groove depth of the narrow grooves 6.

According to the pneumatic tire 1, the groove depth Hb of the lateral grooves 4 and the groove depth Hc of the narrow grooves 6 are configured to be from 1 mm to 5 mm to suppress a decrease in rigidity of the land portions 5. As a result, the effect of maintaining durability is great.

In the pneumatic tire 1 of the first embodiment, the lateral grooves 4 extend at an incline with respect to the tire lateral direction, and a chamfer 4A is preferably formed in the corner portion of the land portion 5 where an acute angle with respect to the tire circumferential direction is formed.

According to the pneumatic tire 1, by providing the chamfer 4A, separation and chipping are less likely to occur and the effect of maintaining durability is great.

As illustrated in FIGS. 2 to 5, the pneumatic tire 1 of the first embodiment preferably further includes a sipe 7 in the tread surface 2A. The sipe 7 communicate with the circumferential groove 3 at one end and terminate within the land portion 5 at the other end without meeting the narrow groove 6. For the sipe 7, the relationships $0.3\text{ mm} \leq Wd \leq 2.0\text{ mm}$, $0.3 \leq Hd/Ha \leq 1.0$, and $0.03 \leq Ld/We \leq 0.2$ are preferably satisfied, where Wd is the groove width, Hd is the groove depth, Ld is the groove length, We is the tire lateral direction dimension of the land portion 5, and Ha is the groove depth of the circumferential groove 3.

According to the pneumatic tire 1, the sipe 7 reduce the rigidity of the land portion 5 so that ground contact pressure is alleviated. As a result, the effect of improving uneven wear resistance performance is great.

First Examples

For the first examples, performance tests for uneven wear resistance performance and durability performance were performed on a plurality of types of test tires of different conditions (see FIGS. 7 and 8).

In the performance tests, pneumatic tires (heavy duty pneumatic tires) having a tire size of 445/50R22.5 were mounted on regular rims, inflated to the regular internal pressure, and mounted on the trailer axle of a test vehicle (2-D•D vehicle (i.e., three axle vehicle with single tire steering axle and tandem dual tire drive axle).

Here, "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organization (ETRTO). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

In the performance test for uneven wear resistance performance, the test vehicle was driven for 100000 miles (about 160000 km) and, thereafter, the area and depth of uneven wear that occurred in the land portions were measured. The measurement results are expressed as index values and evaluated with the Conventional Example being assigned as the reference (100). In this evaluation, larger values are preferable as they indicate excellent uneven wear resistance performance.

In the performance test for durability performance, the test vehicle was driven for 100000 miles (about 160000 km) and, thereafter, the number of separations and chipping that occurred in the land portions was measured. The measurement results are expressed as index values and evaluated with the Conventional Example being assigned as the reference (100). In this evaluation, larger values are preferable as they indicate a lower number of separations and chipping and excellent durability performance.

The pneumatic tire of the Conventional Example indicated in FIG. 7 includes no narrow grooves. The pneumatic tires of each of the Comparative Examples indicated in FIG. 7 include narrow grooves, but the configuration of the narrow grooves is different from the specifications of the First Examples. On the other hand, the pneumatic tires of the Examples indicated in FIGS. 7 and 8 include narrow grooves with a configuration within the specifications.

As can be seen from the test results in FIGS. 7 and 8, the pneumatic tires of Examples 1 to 12 have enhanced uneven wear resistance performance while maintaining durability performance.

Second Embodiment

A second embodiment of the present technology is described in detail below with reference to the drawings. However, the present technology is not limited by the second embodiment. Constituents of the second embodiment include elements that are essentially identical or that can be substituted or easily conceived by a person skilled in the art. Furthermore, the modified examples described in the second embodiment can be combined as desired within the scope apparent to one skilled in the art.

Figure 9:
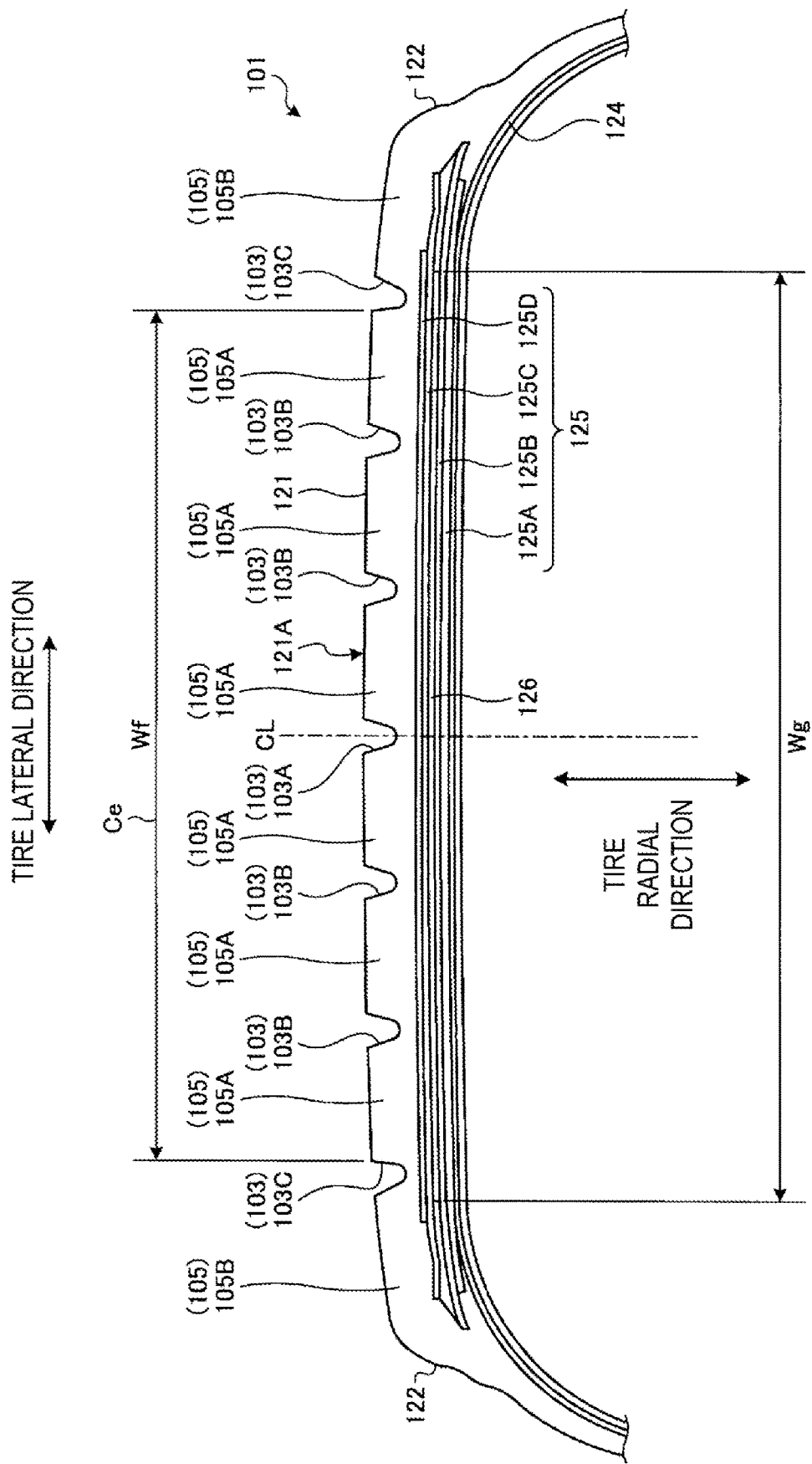
FIG. 9 is a meridian cross-sectional view of a portion of a pneumatic tire according to a second embodiment of the present technology.
Figure 10:
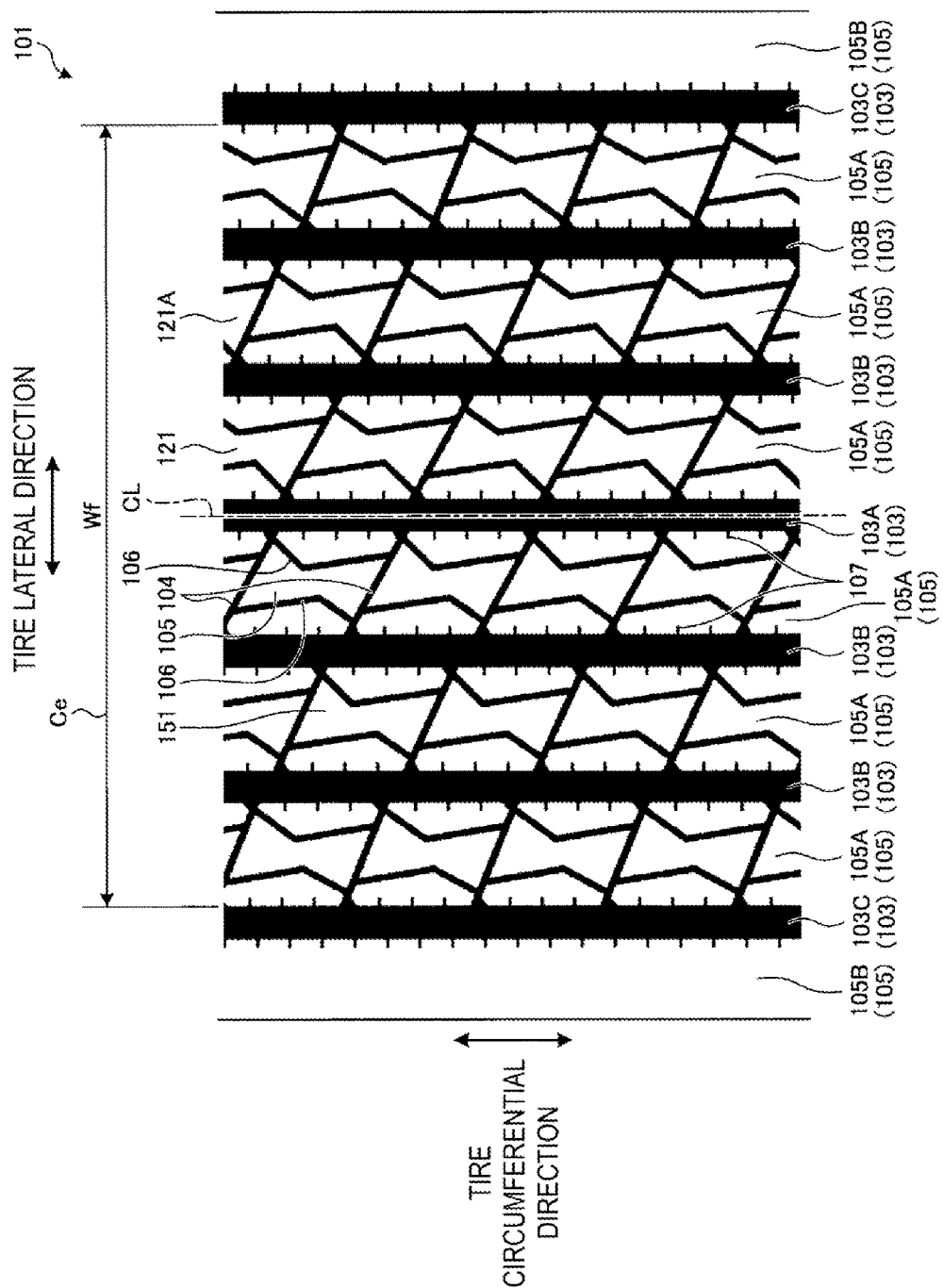
FIG. 10 is a plan view of a tread portion of the pneumatic tire according to a second embodiment of the present technology.
Figure 11:
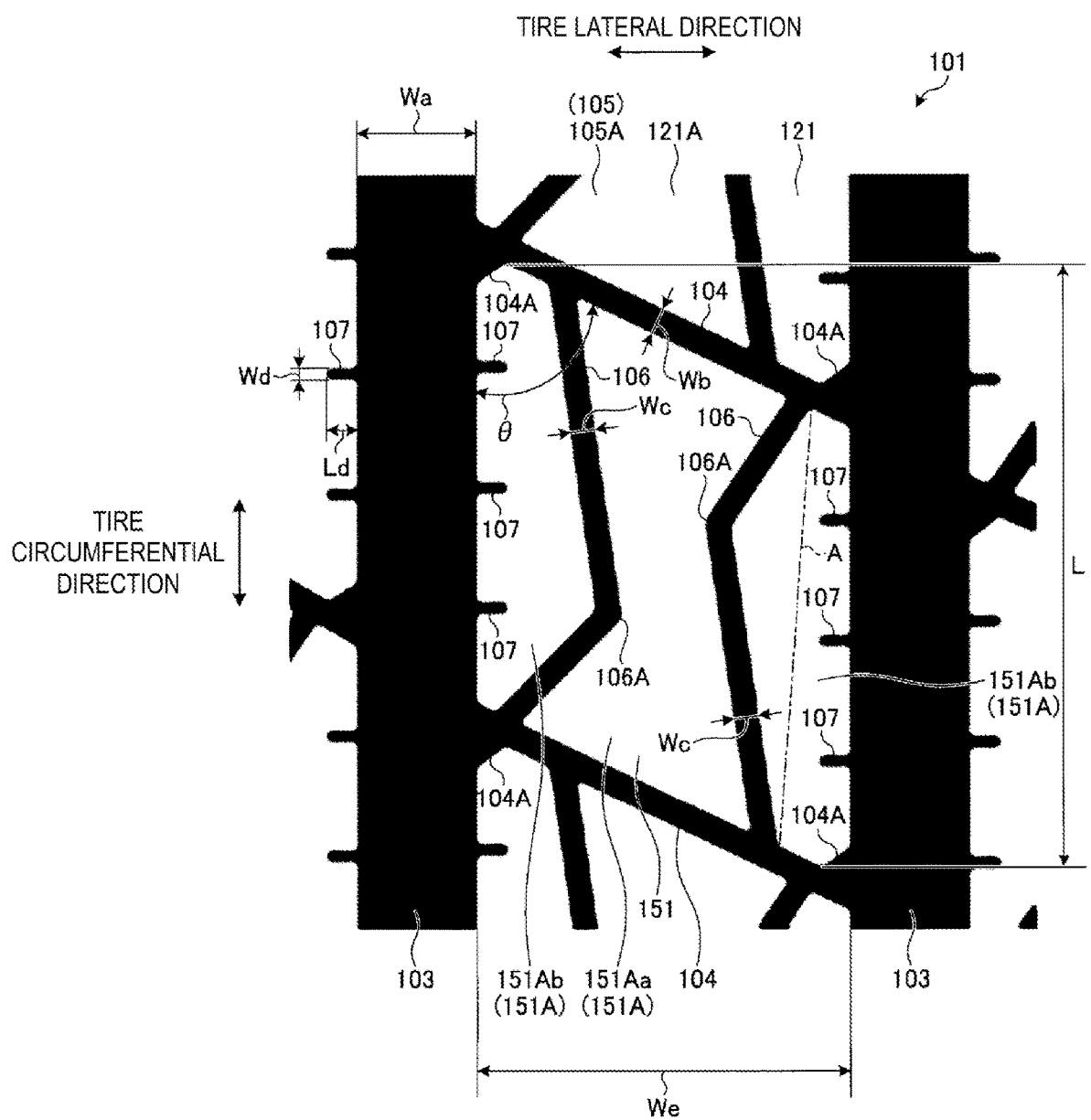
FIG. 11 is an enlarged plan view of the tread portion of the pneumatic tire according to a second embodiment of the present technology.
Figure 12:
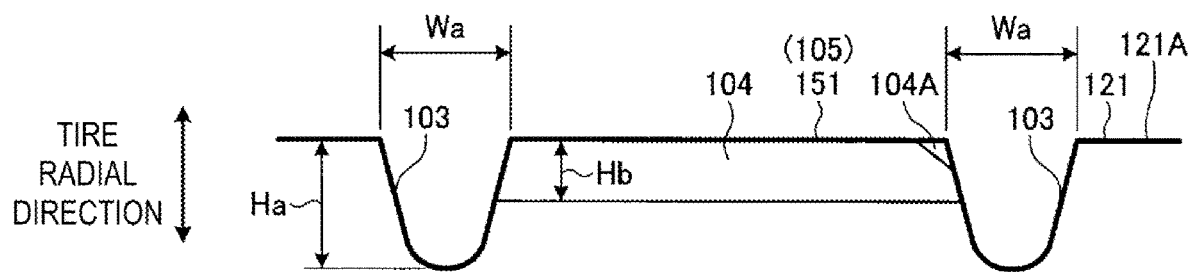
FIG. 12 is an enlarged cross-sectional view of the tread portion of the pneumatic tire according to a second embodiment of the present technology.
Figure 13:
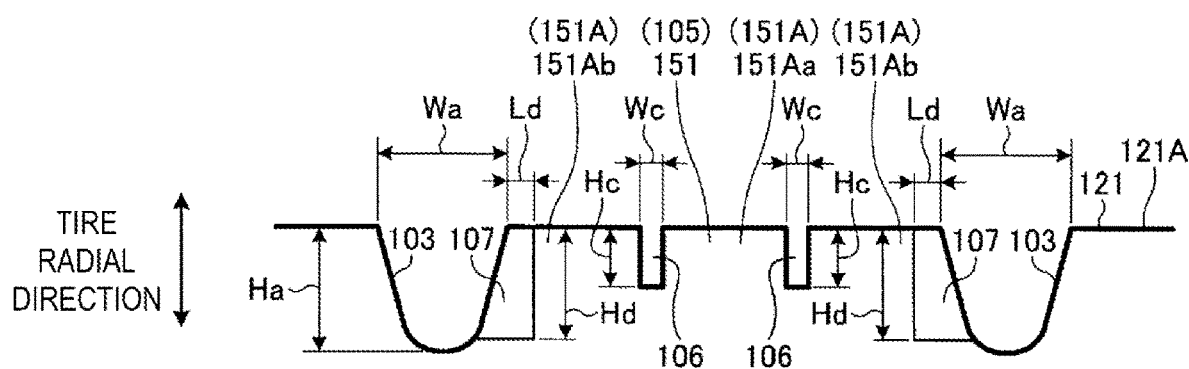
FIG. 13 is an enlarged cross-sectional view of the tread portion of the pneumatic tire according to a second embodiment of the present technology.

FIG. 9 is a meridian cross-sectional view of a portion of a pneumatic tire according to the second embodiment. FIG. 10 is a plan view of a tread portion of the pneumatic tire according to the second embodiment. FIG. 11 is an enlarged plan view of the tread portion of the pneumatic tire according to the second embodiment. FIGS. 12 and 13 are enlarged cross-sectional views of the tread portion of the pneumatic tire according to the second embodiment.

Hereinafter, "tire radial direction" refers to the direction orthogonal to the rotation axis (not illustrated) of a pneumatic tire 101. "Inward in the tire radial direction" refers to the direction toward the rotation axis in the tire radial direction. "Outward in the tire radial direction" refers to the direction away from the rotation axis in the tire radial direction. "Tire circumferential direction" refers to the circumferential direction with the rotation axis as the center axis. Additionally, "tire lateral direction" refers to the direction parallel with the rotation axis. "Inward in the tire lateral direction" refers to the direction toward a tire equatorial plane CL (tire equator line) in the tire lateral direction. "Outward in the tire lateral direction" refers to the direction away from the tire equatorial plane CL in the tire lateral direction. "Tire equatorial plane CL" refers to the plane orthogonal to the rotation axis of the pneumatic tire 101 that passes through the center of the tire width of the pneumatic tire 101. "Tire equator line" refers to the line in the tire circumferential direction of the pneumatic tire 101 that lies on the tire equatorial plane CL. In the second embodiment, the tire equator line and the tire equatorial plane are denoted by the same reference sign CL.

A pneumatic tire 101 according to the second embodiment is a heavy duty pneumatic tire applied to a truck, a bus or the like. As illustrated in FIG. 9, the pneumatic tire 101 includes a tread portion 121, shoulder portions 122 located on both outward side thereof in the tire lateral direction, and a sidewall portion and a bead portion continuing on from each of the shoulder portions 122 in that order. Note that in FIG. 9, the sidewall portion and the bead portion are omitted. The pneumatic tire 101 also includes a carcass layer 124 and a belt layer 125.

The tread portion 121 is made of a rubber material (tread rubber) and is exposed on the outermost side of the pneumatic tire 101 in the tire radial direction, with the surface thereof constituting the profile of the pneumatic tire 101. A tread surface 121A is formed on the outer circumferential surface of the tread portion 121, in other words, on the road contact surface that comes into contact with the road surface when running.

The shoulder portions 122 are portions of the tread portion 121 located outward in the tire lateral direction on both sides. Additionally, the sidewall portions, though not illustrated in the drawings, are exposed on the outermost sides of the pneumatic tire 101 in the tire lateral direction. Additionally, the bead portion, though not illustrated in the drawings, includes a bead core and a bead filler. The bead core is formed by winding a bead wire, which is a steel wire, into an annular shape. The bead filler is a rubber material that is disposed in the space formed by an end of the carcass layer 124 in the tire lateral direction being folded back at the position of the bead core.

Each of the end portions of the carcass layer 124 in the tire lateral direction is folded back at the pair of bead cores from inward to outward in the tire lateral direction, and the carcass layer 124 is stretched in a toroidal shape in the tire circumferential direction to form the framework of the tire. The carcass layer 124 is made of a plurality of carcass cords (not illustrated) disposed in alignment with an angle with respect to the tire circumferential direction along the tire meridian direction at an angle with respect to the tire circumferential direction and coated with coating rubber. The carcass cords are made of steel or organic fibers (polyester, rayon, nylon, or the like).

The belt layer 125 has a multilayer structure in which, in the second embodiment, four belts 125A, 125B, 125C, 125D are layered in the tire radial direction. In the tread portion 121, the belt layer 125 is disposed outward of the carcass layer 124 in the tire radial direction, i.e. on the outer circumference thereof, and covers the carcass layer 124 in the tire circumferential direction. The belts 125A, 125B, 125C, 125D are made of cords (not illustrated) disposed in a predetermined angle with respect to the tire circumferential direction (for example, from 45° to 90° with respect to the tire circumferential direction) and coated with coating rubber. The cords are made of steel or organic fibers (polyester, rayon, nylon, or the like). Each of the belts 125A, 125B, 125C, 125D are disposed with the cords of the different layers in the tire radial direction arranged in a criss-cross manner. Note that for the belt layer 125, it is sufficient that the cords of at least two belts layered in the tire radial direction are arranged in a criss-cross manner.

The belt layer 125 includes a circumferential belt 126. The circumferential belt 126 is made of cords (not illustrated) disposed in alignment in the tire lateral direction at an angle with respect to the tire circumferential direction of 0° (including ±5°) and coated with coating rubber. The cords are made of steel or organic fibers (polyester, rayon, nylon, or the like). The circumferential belt 126 is disposed between the belts of the belt layer 125 at a position in the tire lateral direction encompassing the tire equatorial plane CL. In the second embodiment, the circumferential belt 126 is disposed between the belts 125B, 125C. In other words, the circumferential belt 126 is disposed underlaying or overlaying with respect to the tire radial direction the two belts of the belt layer 125 with cords arranged in a criss-cross manner.

As illustrated in FIGS. 10 to 13, the tread surface 121 is provided with an odd number equal to or greater than seven (seven in the second embodiment) of circumferential grooves 103 in the tread surface 121A. The circumferential grooves 103 are straight grooves extending in the tire circumferential direction parallel with the tire equator line CL. The circumferential grooves 103 are grooves with a groove width (Wa in FIGS. 11 and 13) being from 8 mm to 15 mm and a groove depth (dimension from the opening position on the tread surface 121*a* to the groove bottom, Ha in FIGS. 12 and 13) being from 10 mm to 28 mm. The tread surface 121A is provided with an even number equal to or greater than eight (eight in the second embodiment) rib-like land portions 105 in alignment each other defined by the circumferential grooves 103. The land portions 105 extend in the tire circumferential direction.

The circumferential grooves 103 include a central circumferential groove 103A disposed with its center on the tire equatorial plane CL, outer circumferential grooves 103C disposed outermost in the tire lateral direction, and intermediate circumferential grooves 103B disposed between the central circumferential groove 103A and the outer circumferential grooves 103C. The land portions 105 includes inner land portions 105A disposed inward of both outer circumferential grooves 103C in the tire lateral direction, and outer land portions 105B disposed outward of both outer circumferential grooves 103C in the tire lateral direction. Additionally, the region inward of both outer circumferential grooves 103C in the tire lateral direction where the inner land portions 105A are disposed is referred to as center region Ce. That is, the inner land portions 105A are disposed in the center region Ce.

As illustrated in FIGS. 10 to 13, in the tread surface 121, each inner land portion 105A in the center region Ce of the tread portion 121A is provided with lateral grooves (may also be referred to as lateral direction grooves) 104. The lateral grooves 104 communicate at both ends with two circumferential grooves 103 adjacent in the tire lateral direction. The lateral groove 104 refers to a groove with a groove width (Wb in FIG. 11) being from 1 mm to 4 mm and a groove depth (dimension from the opening position on the tread surface 121A to the groove bottom, Hb in FIG. 12) being from 1 mm to 5 mm. In the inner land portions 105A, each of the land portions 105 defined by adjacent circumferential grooves 103 is divided into blocks 151 by the lateral groove 104. Note that as illustrated in FIG. 10, the opening portions of the lateral grooves 104 to the circumferential grooves 103 face one another across the groove walls of the circumferential grooves 103 in the tire lateral direction, such that the lateral grooves 104 are disposed continuously in the tire lateral direction. However no such limitation is intended, and the lateral grooves 104 may not be continuous in the tire lateral direction.

As illustrated in FIGS. 10 to 13, the blocks 151 defined in the tread portion 121 by the circumferential grooves 103 and the lateral grooves 104 are provided with a narrow groove 106 that opens at both ends to two lateral grooves 104 adjacent in the tire circumferential direction. The narrow groove 106 refers to a groove with a groove width (Wc in FIGS. 11 and 13) being from 1 mm to 4 mm and a groove depth (dimension from the opening position on the tread surface 121A to the groove bottom, Hc in FIG. 13) being from 1 mm to 5 mm. The blocks 151 are divided by the narrow groove 106 in the tire lateral direction to form small blocks 151A. As illustrated in FIGS. 10 to 13, one block 151 is provided with two narrow grooves 106 disposed in alignment in the tire lateral direction. Thus, the small blocks 151A include a central small block 151Aa located at a center of the small block 151A in the tire lateral direction and two outer small blocks 151Ab located on either side of central small block 151Aa in the tire lateral direction. Additionally, a bent portion 106A is formed in an intermediate portion of the narrow groove 106 illustrated in FIG. 11. However, the bent portion 106A may not be formed, and the narrow groove 106 may extend in a linear manner (see FIG. 17). It is sufficient that at least one narrow groove 106 is provided in each block 151 (see FIG. 18). In such a configuration, the small block 151A includes two outer small blocks 151Ab located on either side in the tire lateral direction and no central small block 151Aa is present.

As illustrated in FIGS. 10 to 13, the tread portion 121 includes, in the tread surface 121A, a sipe 107 that communicate with the circumferential groove 103 at one end and terminate within the land portion 105 (small block 151A (outer small block 151Ab)) at the other end without meeting the narrow groove 106. The sipe 107 can decrease the rigidity of the land portion 105 (small block 151A (outer small block 151Ab)) and alleviate ground contact pressure. Thus, uneven wear resistance performance can be improved. The same number of sipes 107 are provided in each block 151, and all the sipes 107 have the same groove width Wd, groove depth Hd, and groove length Ld. Accordingly, the sipes 107 do not cause variation in rigidity across the land portions 105. The sipe 107 is a groove having the groove width Wd, the groove depth Hd, and the groove length Ld satisfy the relationships with the tire lateral direction dimension We of the land portion 105 and the groove depth Ha of the circumferential groove 103 of: $0.3 \text{ mm} \leq Wd \leq 2.0 \text{ mm}$, $0.3 \leq Hd/Ha \leq 1.0$, and $0.03 \leq Ld/We \leq 0.2$.

As illustrated in FIGS. 11 and 12, in the tread portion 121, a chamfer 104A may be formed in the corner portion of the land portion 105 (block 151), where the lateral groove 104 opens at an incline to the circumferential groove 103, forming an acute angle. By providing the chamfer 104A, separation and chipping are less likely to occur in the land portion 105 (block 151) and durability can be maintained.

Figure 14:
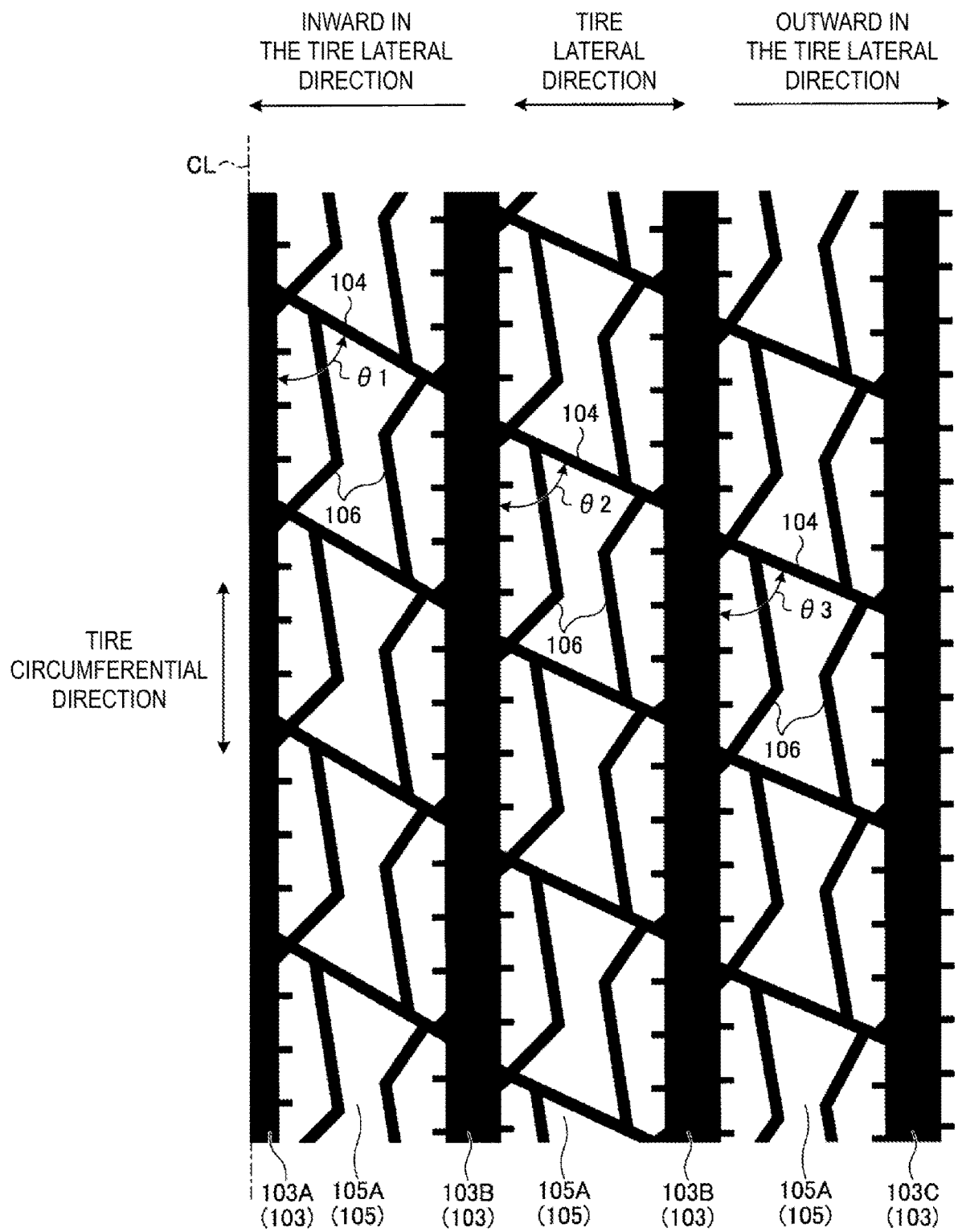
FIG. 14 is an enlarged plan view of the tread portion of the pneumatic tire according to a second embodiment of the present technology.
Figure 15:
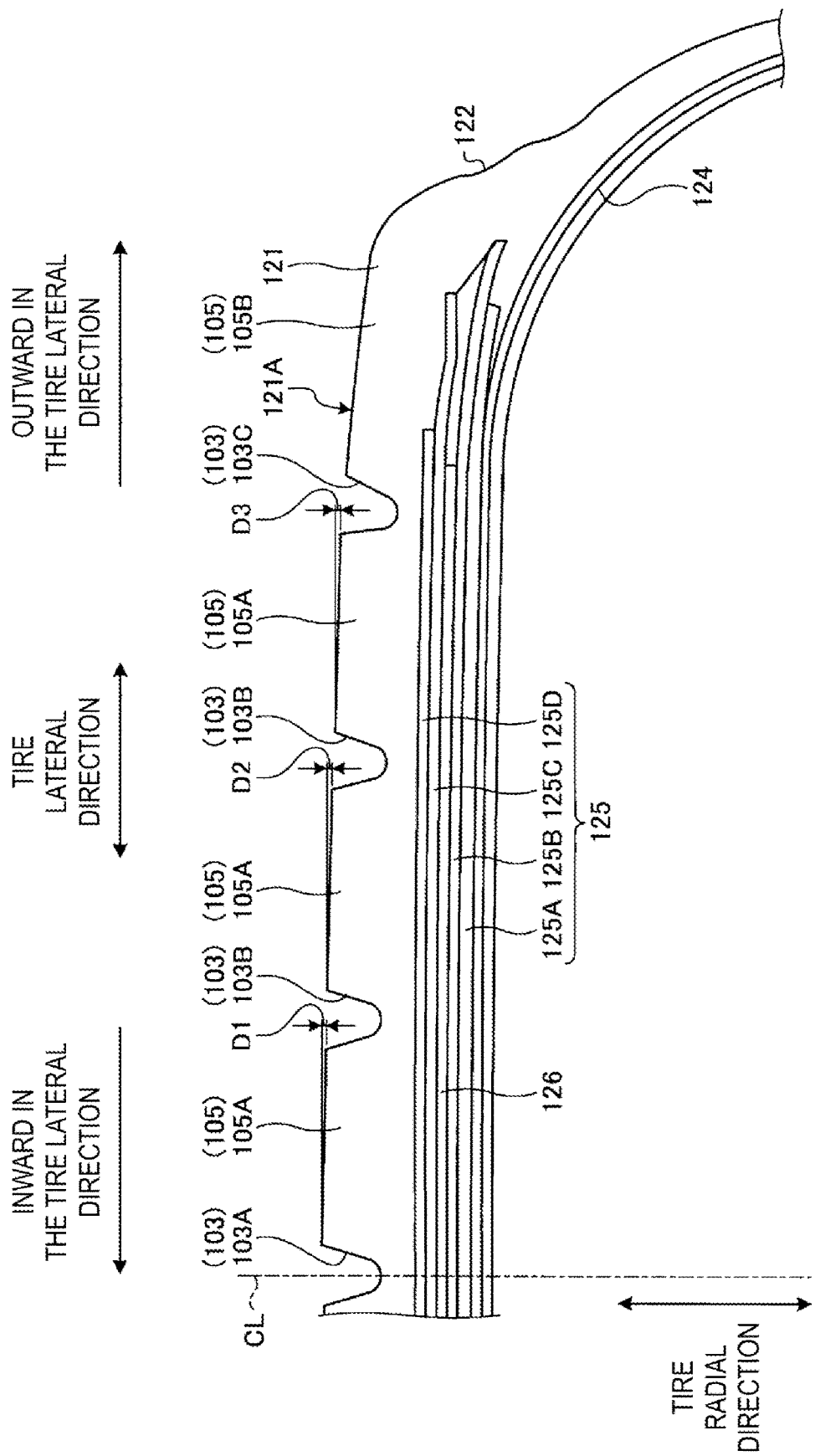
FIG. 15 is an enlarged meridian cross-sectional view of the pneumatic tire according to a second embodiment of the present technology.
Figure 16:
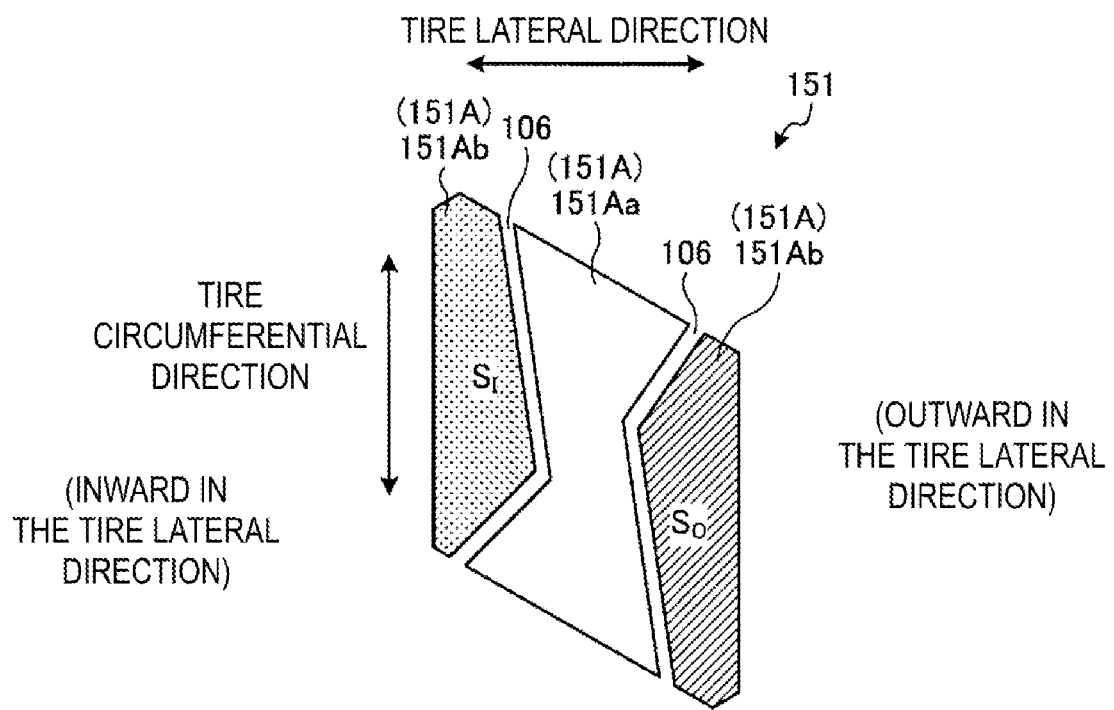
FIG. 16 is an enlarged plan view of the tread portion of the pneumatic tire according to a second embodiment of the present technology.
Figure 17:
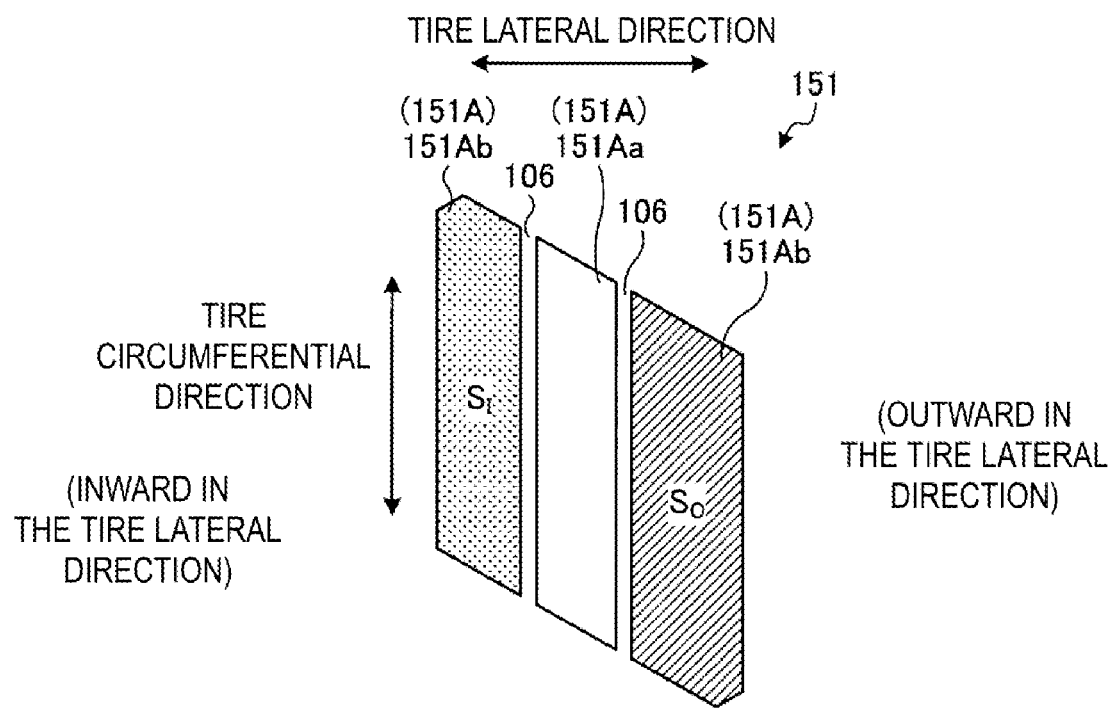
FIG. 17 is an enlarged plan view of the tread portion of the pneumatic tire according to a second embodiment of the present technology.
Figure 18:
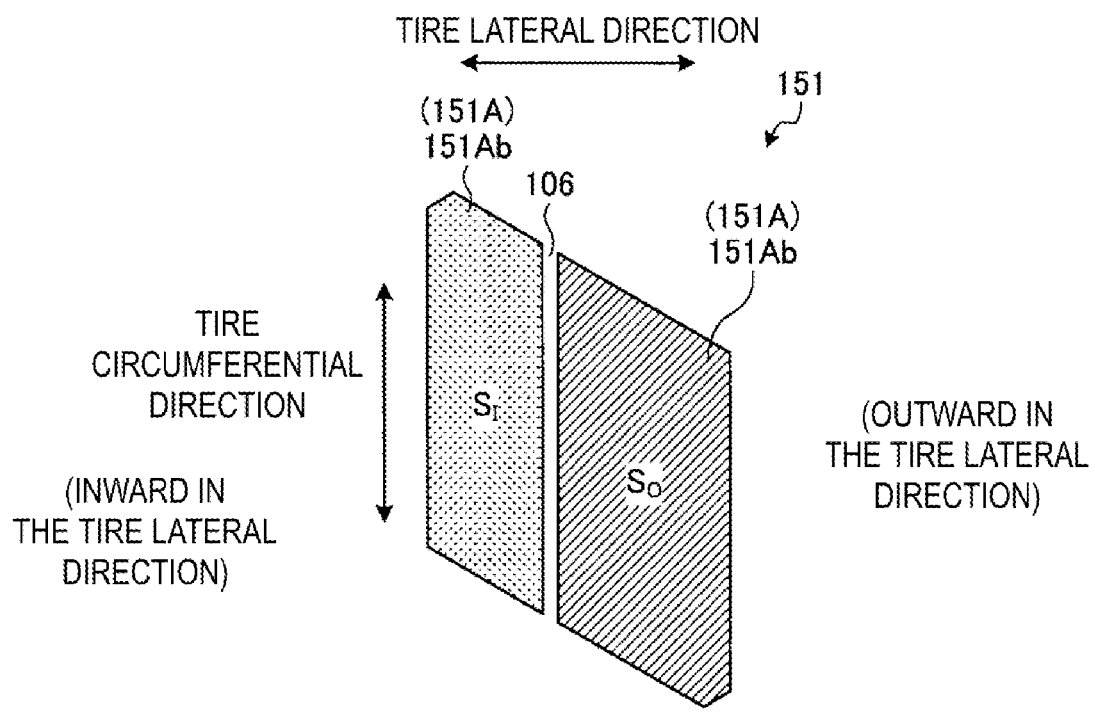
FIG. 18 is an enlarged plan view of the tread portion of the pneumatic tire according to a second embodiment of the present technology.

FIG. 14 is an enlarged plan view illustrating the tread portion of the pneumatic tire according to the second embodiment. FIG. 15 is an enlarged meridian cross-sectional view of the pneumatic tire according to the second embodiment. FIGS. 16 to 18 are enlarged plan views of the tread portion of the pneumatic tire according to the second embodiment.

As illustrated in FIGS. 11 and 14, in the pneumatic tire 101 according to the second embodiment, an inclination angle θ of the acute angle of the lateral groove 104 with respect to the tire circumferential direction is the smallest in the land portion 105 (inner land portion 105A) closest to the tire equatorial plane CL and is larger the closer the land portion 105 (inner land portion 105A) is located to the tire lateral direction outer side. As illustrated in FIG. 14, in the second embodiment, three land portions 105 (inner land portions 105A) are provided on one side located outward from the tire equatorial plane CL (central circumferential groove 103A) as a border in the tire lateral direction. There are the acute angle of the lateral groove 104 with respect to the tire circumferential direction in the land portion 105 (inner land portion 105A) closest to the tire equatorial plane CL is an inclination angle θ1, the acute angle of the lateral groove 104 with respect to the tire circumferential direction in the land portion 105 (inner land portion 105A) in an intermediate position in the tire lateral direction is an inclination angle θ2, and the acute angle of the lateral groove 104 with respect to the tire circumferential direction in the land portion 105 (inner land portion 105A) outermost in the tire lateral direction is an inclination angle θ3 in the three land portions 105 (inner land portions 105A). The inclination angles θ1, θ2, θ3 have a relationship satisfying θ1<θ2<θ3.

According to the pneumatic tire 101, by using the inclination angles θ1, θ2, θ3 of the acute angles of the lateral grooves 104 with respect to the tire circumferential direction, the rigidity of the land portion 105 (inner land portion 105A) closest to the tire equatorial plane CL is reduced, and the rigidity of the land portions 105 (inner land portions 105A) is progressively higher going outward in the tire lateral direction. Thus, the rigidity difference between the tire equator surface CL region and the outer region in the tire lateral direction caused by the circumferential belt 126 is suppressed while obtaining the effect of suppressing the radial growth when the tire is new and thereafter by increasing the circumferential rigidity by using the circumferential belt 126. As a result, the circumferential rigidity of the tread portion 121 across the tire lateral direction can be made uniform and uneven wear can be suppressed, thus the improved uneven wear resistance performance can be provided even with a configuration including the circumferential belt 126.

Note that the inclination angle θ of the acute angle of the lateral groove 104 with respect to the tire circumferential direction is preferably from 50° to 80°. When the inclination angle θ of the acute angle of the lateral groove 104 with respect to the tire circumferential direction approaches 0°, the rigidity of the acute angle portion is weakened, which may cause separation and chipping. When the inclination angle θ of the acute angle of the lateral groove 104 with respect to the tire circumferential direction approaches 90°, rigidity is excessively high and the difference in rigidity between the blocks 151 closer to the tire equatorial plane CL and the blocks 151 located outward in the lateral direction is difficult to differ. Thus, uneven wear resistance performance is reduced. Thus, the inclination angle θ of the acute angle of the lateral groove 104 with respect to the tire circumferential direction is preferably from 50° to 80° to suitably maintain rigidity in the blocks 151. As illustrated in FIG. 10, the opening portions of the lateral grooves 104 to the circumferential grooves 103 face one another on each of the groove walls of the circumferential grooves 103 in the tire lateral direction. The inclination angles θ (θ1, θ2, θ3) starting from the tire equatorial plane CL going outward in the tire lateral direction have the relationship described above. Thus, the lateral grooves 104 are arranged in roughly an S-shape in the entire center region Ce from end to end in the tire lateral direction. Furthermore, the blocks 151, similar to the lateral grooves 104, are also arranged in roughly an S-shape in the entire center region Ce from end to end in the tire lateral direction. By arranging the lateral grooves 104 and the blocks 151 in roughly an S-shape continuous in the tire lateral direction, uniform circumferential rigidity of the tread portion 121 across the tire lateral direction can be easily achieved. Note that uniform circumferential rigidity across the tire lateral direction can still be achieved with the lateral grooves 104 and the blocks 151 not being continuous in the tire lateral direction.

In the pneumatic tire 101 of the second embodiment, the difference in the inclination angle θ of the acute angle of the lateral groove 104 with respect to the tire circumferential direction of two land portions 105 (inner land portions 105A) adjacent in the tire lateral direction is preferably larger as it goes closer to the tire equatorial plane CL and smaller as it goes closer to the tire lateral direction outer side. As illustrated in FIG. 14, in the second embodiment, three land portions 105 (inner land portions 105A) are provided on one side located outward from the tire equatorial plane CL (central circumferential groove 103A) as a border in the tire lateral direction. There are the acute angle of the lateral groove 104 with respect to the tire circumferential direction in the land portion 105 (inner land portion 105A) closest to the tire equatorial plane CL is an inclination angle θ1, the acute angle of the lateral groove 104 with respect to the tire circumferential direction in the land portion 105 (inner land portion 105A) in an intermediate position in the tire lateral direction is an inclination angle θ2, and the acute angle of the lateral groove 104 with respect to the tire circumferential direction in the land portion 105 (inner land portion 105A) outermost in the tire lateral direction is an inclination angle θ3 in the three land portions 105 (inner land portions 105A). Additionally, the differences between the inclination angles θ of the acute angles of the lateral grooves 104 with respect to the tire circumferential direction in the two land portions 105 (inner land portions 105A) adjacent in the tire lateral direction are θ2−θ1 and θ3−θ2. Here, θ2−θ1 and θ3−θ2 satisfy the relationship θ2−θ1>θ3−θ2.

According to the pneumatic tire 101, the difference between the inclination angles θ of the acute angles of the lateral grooves 104 with respect to the tire circumferential direction in the two land portions 105 (inner land portions 105A) adjacent in the tire lateral direction corresponds to the difference in rigidity between the two adjacent land portions 105 (inner land portions 105A). Accordingly, by the difference between the inclination angles θ of the acute angles of the lateral grooves 104 with respect to the tire circumferential direction being larger as it goes closer to the tire equatorial plane CL and smaller as it goes closer to the tire lateral direction outer side, the difference in rigidity between the land portions 105 (inner land portions 105A) adjacent in the tire lateral direction is larger as it goes closer to the tire equatorial plane CL. This allows excessive circumferential rigidity in the tire equatorial plane CL region caused by the circumferential belt 126 to be suppressed. As a result, the circumferential rigidity of the tread portion 121 across the tire lateral direction can further be made uniform and uneven wear can be suppressed, thus the effect of significantly improving uneven wear resistance performance can be provided even with a configuration including the circumferential belt 126.

Note that θ2−θ1 and θ3−θ2 preferably satisfy the relationship 1°≤(θ2−θ1)−(θ3−θ2)≤5°, so that the circumferential rigidity of the tread portion 121 across the tire lateral direction can be further made uniform by the lateral grooves 104.

As illustrated in FIG. 9, in the pneumatic tire 101 of the second embodiment, the region inward of both outer circumferential grooves 103C, 103C in the tire lateral direction where the inner land portions 105A are disposed is referred to the center region Ce, and a tire lateral direction dimension Wf of the center region Ce and a tire lateral direction dimension Wg of the circumferential belt 126 preferably satisfy the relationship Wg/Wf≥1.03.

In the region outward of the circumferential belt 126 in the tire lateral direction, circumferential rigidity is not high, thus, in this region, it is not necessary to make rigidity uniform by using the inclination angles θ of the acute angles of the lateral grooves 104 with respect to the tire circumferential direction. Accordingly, the center region Ce is preferably disposed within the range of the circumferential belt 126.

Note that the tire lateral direction dimensions Wf, Wg preferably satisfy the relationship Wg/Wf≥1.05, so that the range in which rigidity is made uniform by using the inclination angles θ of the acute angles of the lateral grooves 104 with respect to the tire circumferential direction is sufficiently disposed within the range of the circumferential belt 126.

In the pneumatic tire 101 of the second embodiment, when the pneumatic tire 101 is mounted on a regular rim, inflated to the regular internal pressure, and in an unloaded state, the difference in tire radial direction dimension between both ends in the tire lateral direction of the land portions 105 (inner land portions 105A) is preferably smaller as it goes closer to the tire equatorial plane CL and larger as it goes closer to the tire lateral direction outer side, and a difference in tire radial direction dimension Do of the land portion 105 (inner land portion 105A) located outermost in the tire lateral direction and a difference in tire radial direction dimension Dm of the land portion 105 (inner land portion 105A) adjacent thereto inward in the tire lateral direction preferably satisfy the relationship Do/Dm≥1.5. As illustrated in FIG. 15, in the second embodiment, three land portions 105 (inner land portions 105A) are provided on one side located outward from the tire equatorial plane CL (central circumferential groove 103A) in the tire lateral direction. There are a difference in tire radial direction dimension between both ends in the tire lateral direction of the land portion 105 (inner land portion 105A) closest to the tire equatorial plane CL is D1, a difference in tire radial direction dimension between both ends in the tire lateral direction of the land portion 105 (inner land portion 105A) in an intermediate position in the tire lateral direction is D2, and a difference in tire radial direction dimension between both ends in the tire lateral direction of the land portion 105 (inner land portion 105A) outermost in the tire lateral direction is D3 in the three land portions 105 (inner land portions 105A). The differences in tire radial direction dimension D1, D2, D3 satisfy the relationship D1<D2<D3, and the difference in tire radial direction dimension Do (D3) of the land portion 105 (inner land portion 105A) outermost in the tire lateral direction and the difference in tire radial direction dimension Dm (D2) of the land portion 105 (inner land portion 105A) adjacent thereto inward in the tire lateral direction satisfy the relationship D3/D2≥1.5.

Here, "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organization (ETRTO). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

According the pneumatic tire 101, the circumferential rigidity is smaller as the difference in tire radial direction dimension between both ends in the tire lateral direction of the land portion 105 (inner land portion 105A) is smaller, and the circumferential rigidity is larger as the difference is lager. Also, in relation to the difference in tire radial direction dimension Do of the land portion 105 (inner land portion 105A) outermost in the tire lateral direction and the difference in tire radial direction dimension Dm of the land portion 105 (inner land portion 105A) adjacent thereto inward in the tire lateral direction, the difference in rigidity is larger as the difference in tire radial direction dimension Do located outward in the tire lateral direction is larger. Accordingly, as the circumferential rigidity is decreased in the land portions 105 (inner land portions 105A) against the increase of the circumferential rigidity in the tire equatorial plane CL region by the circumferential belt 126, the circumferential rigidity is increased in the land portions 105 (inner land portions 105A) against the decrease of the circumferential rigidity in the region outward from the circumferential belt 126, and the difference in rigidity of the land portions 105 in the outer regions in the tire lateral direction are specified by the relationship Do/Dm, a difference in circumferential rigidity in the tire lateral direction in the land portions 105 (inner land portions 105A) caused by the circumferential belt 126 can be suppressed. As a result, the circumferential rigidity of the tread portion 121 across the tire lateral direction can further be made uniform and uneven wear can be suppressed, thus the effect of significantly improving uneven wear resistance performance can be provided even with a configuration including the circumferential belt 126.

Note that the differences in tire radial direction dimension Do, Dm preferably satisfy the relationship Do/Dm≥2.0. This allows the difference in rigidity of the land portions 105 (inner land portions 105A) in outer end regions of the circumferential belt 126 in the tire lateral direction, where the difference in circumferential rigidity is large, to be increased, thus allowing the circumferential rigidity of the tread portion 121 in the tire lateral direction to be further made uniform.

As illustrated in FIG. 11, in the pneumatic tire 101 of the second embodiment, the land portion 105 (inner land portion 105A) is formed into the block 151 defined by two circumferential grooves 103 adjacent in the tire lateral direction and two lateral grooves 104 adjacent in the tire circumferential direction, and the block 151 is divided in the tire lateral direction by the narrow grooves 106 that open on both ends to the two lateral grooves 104 adjacent in the tire circumferential direction to form the small blocks 151A. As illustrated in FIGS. 16 to 18, in the blocks 151, a surface area $S_I$ of the outer small block 151Ab closest to the tire equatorial plane CL and a surface area $S_O$ of the outer small block 151Ab closest to the tire lateral direction outer side preferably have the relationship $S_O/S_I \geq 1.01$.

According to the pneumatic tire 101, in the blocks 151, by the surface area $S_O$ of the outer small block 151Ab located closest to the tire lateral direction outer side being greater than the surface area $S_I$ of the outer small block 151Ab closest to the tire equatorial plane CL, the rigidity on the side closer to the tire lateral direction outer side in the block 151 can be increased. As a result, the circumferential rigidity of the tread portion 121 across the tire lateral direction can further be made uniform and uneven wear can be suppressed, thus the effect of significantly improving uneven wear resistance performance can be provided even with a configuration including the circumferential belt 126.

Note that the surface areas $S_I$, $S_O$ preferably satisfy the relationship $1.03 \leq S_O/S_I \leq 1.10$. This ensures that the difference in rigidity in the blocks 151 in the tire lateral direction is not excessive. Additionally, the surface areas $S_I$, $S_O$ are not including the sipes 107 described above. In other words, the sipes 107 do not cause variation in rigidity. Thus, as described above, the same number of sipes 107 are provided in each block 151, and all the sipes 107 have the same groove width Wd, groove depth Hd, and groove length Ld.

Furthermore, as illustrated in FIG. 11, in the pneumatic tire 101 of the second embodiment, the land portions 105 (inner land portions 105A) are formed into the blocks 151 defined by two circumferential grooves 103 adjacent in the tire lateral direction and two lateral grooves 104 adjacent in the tire circumferential direction, and the aspect ratio of the tire circumferential direction dimension L and the tire lateral direction dimension We of each block 151 is preferably $1.2 \leq L/We \leq 2.0$.

According to the pneumatic tire 101, the aspect ratio of the tire circumferential direction dimension L and the tire lateral direction dimension We of the block 151 is configured to the range described above to make it easier for the block 151 to have a difference in rigidity.

Note that the aspect ratio of the tire circumferential direction dimension L and the tire lateral direction dimension We of the block 151 preferably satisfies the range $1.4 \leq L/We \leq 1.8$. This ensures that the difference in rigidity in the block 151 is not excessive.

Second Examples

For the second examples, performance tests for uneven wear resistance performance were performed on a plurality of types of test tires of different conditions (see FIGS. 19 and 20).

In the performance tests, pneumatic tires (heavy duty pneumatic tires) having a tire size of 445/50R22.5 were mounted on regular rims (22.5"×14.00") specified by TRA, inflated to the regular internal pressure (830 kPa), and mounted on the trailer axle of a test vehicle (6×4 tractor-trailer).

In the performance test for uneven wear resistance performance, the test vehicle was driven for 10 km, and thereafter, the groove depth of the inner circumferential grooves and the outer circumferential grooves were measured. This difference is measured as the uneven wear amount. The measurement results are expressed as index values and evaluated with the Conventional Example being assigned as the reference (100). In this evaluation, larger values are preferable as they indicate excellent uneven wear resistance performance.

The pneumatic tires according to the Conventional Example and Examples 101 to 118 indicated in FIGS. 19 and 20 include a circumferential belt, three land portions divided in the tire lateral direction by intermediate circumferential grooves disposed between a central circumferential groove and an outer circumferential groove, and a plurality of lateral grooves disposed in alignment in the tire lateral direction in each of the land portions, the lateral grooves being inclined with respect to the tire circumferential direction and opening at both ends to the circumferential grooves adjacent in the tire lateral direction. In the pneumatic tire of the Conventional Example, the inclination angle θ1 of the acute angle of the lateral groove with respect to the tire circumferential direction in the land portion closest to the tire equatorial plane CL, the inclination angle θ2 of the acute angle of the lateral groove with respect to the tire circumferential direction in the land portion in an intermediate position in the tire lateral direction, and the inclination angle θ3 of the acute angle of the lateral groove with respect to the tire circumferential direction in the land portion outermost in the tire lateral direction have the relationship θ1=θ2=θ3. On the other hand, in the pneumatic tires of Examples 101 to 118, θ1<θ2<θ3 is satisfied. The pneumatic tires of the Conventional Example and Examples 101 to 110 include no narrow grooves. The pneumatic tires of Examples 111 to 118 include narrow grooves and the relationship of the surface areas $S_O$, $S_I$ of the small blocks is specified.

As can be seen from the test results in FIGS. 19 and 20, the pneumatic tires of Examples 101 to 118 have enhanced uneven wear resistance performance.

The invention claimed is:

1. A pneumatic tire, comprising:
   a circumferential belt, in a tread portion, disposed in a tire lateral direction encompassing a position of a tire equatorial plane comprising cords extending in a tire circumferential direction disposed in alignment in a tire lateral direction;
   a plurality of circumferential grooves, in a tread surface of the tread portion, disposed in alignment in the tire lateral direction extending in the tire circumferential direction, comprising a central circumferential groove disposed on the tire equatorial plane, outer circumferential grooves disposed outermost in the tire lateral direction, and intermediate circumferential grooves disposed between the central circumferential groove and the outer circumferential grooves;

a land portion disposed between the central circumferential groove and one of the outer circumferential grooves being divided into at least three land portions in the tire lateral direction by the intermediate circumferential grooves; and a plurality of lateral grooves, in each of the land portions, disposed in alignment in the tire lateral direction at an incline with respect to the tire circumferential direction, opening at both ends to the circumferential grooves adjacent in the tire lateral direction; wherein an inclination angle of an acute angle of the lateral grooves with respect to the tire circumferential direction is smallest in the land portion closest to the tire equatorial plane and is larger in the land portion closer to a tire lateral direction outer side;

each of the at least three land portions are formed to have a plurality of blocks defined by two circumferential grooves adjacent in the tire lateral direction and two lateral grooves adjacent in the tire circumferential direction;

the blocks are divided in the tire lateral direction to form small blocks by a narrow groove that opens at both ends to two of the lateral grooves adjacent in the tire circumferential direction; and in the plurality of blocks, a surface area $S_I$ of the small block closest to the tire equatorial plane and a surface area $S_O$ of the small block closest to the tire lateral direction outer side satisfy a relationship $1.03 \leq S_O/S_I \leq 1.10$.

2. The pneumatic tire according to claim 1, wherein the lateral grooves between the two of the land portions adjacent in the tire lateral direction have a difference in the inclination angle being larger closer to the tire equatorial plane and smaller closer to the tire lateral direction outer side.

3. The pneumatic tire according to claim 1, wherein a center region is a region defined between the outer circumferential grooves, a tire lateral direction dimension Wf of the center region and a tire lateral direction dimension Wg of the circumferential belt satisfy a relationship $Wg/Wf \geq 1.03$.

4. The pneumatic tire according to claim 1, wherein when the pneumatic tire is mounted on a regular rim, inflated to a regular internal pressure, and in an unloaded state, a difference in tire radial direction dimension between both ends in the tire lateral direction of the land portions is smaller closer to the tire equatorial plane and larger closer to the tire lateral direction outer side, and a difference in tire radial direction dimension Do of the land portion located outermost in the tire lateral direction and a difference in tire radial direction dimension Dm of the land portion adjacent thereto inward in the tire lateral direction satisfy a relationship $Do/Dm \geq 1.5$.

5. The pneumatic tire according to claim 1, wherein the land portions are formed to have a plurality of blocks defined by two circumferential grooves adjacent in the tire lateral direction and two lateral grooves adjacent in the tire circumferential direction; and an aspect ratio of a tire circumferential direction dimension L and a tire lateral direction dimension We of each of the blocks satisfies $1.2 \leq L/We \leq 2.0$.

6. The pneumatic tire according to claim 2, wherein a center region is a region defined between the outer circumferential grooves, a tire lateral direction dimension Wf of the center region and a tire lateral direction dimension Wg of the circumferential belt satisfy a relationship $Wg/Wf \geq 1.03$.

7. The pneumatic tire according to claim 6, wherein when the pneumatic tire is mounted on a regular rim, inflated to a regular internal pressure, and in an unloaded state, a difference in tire radial direction dimension between both ends in the tire lateral direction of the land portions is smaller closer to the tire equatorial plane and larger closer to the tire lateral direction outer side, and a difference in tire radial direction dimension Do of the land portion located outermost in the tire lateral direction and a difference in tire radial direction dimension Dm of the land portion adjacent thereto inward in the tire lateral direction satisfy a relationship $Do/Dm \geq 1.5$.

8. The pneumatic tire according to claim 7, wherein the land portions are formed to have a plurality of blocks defined by two circumferential grooves adjacent in the tire lateral direction and two lateral grooves adjacent in the tire circumferential direction; and an aspect ratio of a tire circumferential direction dimension L and a tire lateral direction dimension We of each of the blocks satisfies $1.2 \leq L/We \leq 2.0$.

* * * * *